United States Patent [19]

Furuya et al.

[11] Patent Number: 4,731,989

[45] Date of Patent: Mar. 22, 1988

[54] NITROGEN OXIDES DECREASING COMBUSTION METHOD

[75] Inventors: Tomiaki Furuya; Susumu Yamanaka, both of Yokohama; Terunobu Hayata, Kawasaki; Junji Koezuka, Yokohama, all of Japan

[73] Assignee: Kabushiki Kaisha Toshiba, Japan

[21] Appl. No.: 42,630

[22] Filed: Apr. 23, 1987

Related U.S. Application Data

[63] Continuation of Ser. No. 930,977, Nov. 13, 1986, abandoned, which is a continuation of Ser. No. 676,936, Nov. 30, 1984, abandoned.

[30] Foreign Application Priority Data

| Dec. 7, 1983 | [JP] | Japan | 58-229967 |
| Feb. 23, 1984 | [JP] | Japan | 59-31363 |
| Mar. 7, 1984 | [JP] | Japan | 59-41909 |
| Mar. 27, 1984 | [JP] | Japan | 59-59431 |

[51] Int. Cl.$^4$ ............................ F02C 7/00; F02C 7/26
[52] U.S. Cl. .................................. 60/39.05; 60/39.06; 60/723; 431/7
[58] Field of Search ............. 60/39.06, 39.461, 39.822, 60/723, 39.05, 39.55; 431/7, 328

[56] References Cited

U.S. PATENT DOCUMENTS

| 3,914,090 | 10/1975 | Pfefferle | 431/9 |
| 3,928,961 | 12/1975 | Pfefferle | 60/39.02 |
| 3,940,923 | 3/1976 | Pfefferle | 60/39.06 |
| 3,982,879 | 9/1976 | Pfefferle | 431/10 |
| 4,019,316 | 4/1977 | Pfefferle | 60/39.02 |
| 4,047,877 | 9/1977 | Flanagan | 60/39.06 |
| 4,065,917 | 1/1978 | Pfefferle | 60/39.82 |
| 4,197,701 | 4/1980 | Boyum | 60/39.06 |

FOREIGN PATENT DOCUMENTS

| 9523 | 4/1980 | European Pat. Off. |
| 2179019 | 11/1973 | France. |
| 2382584 | 9/1978 | France. |
| 1570180 | 6/1980 | United Kingdom. |

OTHER PUBLICATIONS

Lew, H. G. et al, American Society of Mechanical Engineers, Paper No. 79-GT-150, 1979, "Experimentally Determined Catalytic Reactor Behavior and Analysis for Gas Turbine Combustors".

Primary Examiner—Louis J. Casaregola
Attorney, Agent, or Firm—Schwartz, Jeffery, Schwaab, Mack, Blumenthal & Evans

[57] ABSTRACT

A nitrogen oxides decreasing combustion method which comprises; a first step of mixing a fuel and air with each other; a second step of bringing the mixture obtained in the first step, into contact with a packed catalyst so as to cause a portion of the mixture to burn only through a catalytic reaction; and a third step of adding a fresh supply of the fuel to a stream obtained from the second step to form a mixed gas and causing the mixed gas to undergo non-catalytic thermal combustion; the temperature of said packed catalyst being lower than the ignition temperature of the mixture and the adiabatic flame temperature of said mixed gas being lower than a temperature at which the nitrogen oxides occur.

25 Claims, 39 Drawing Figures

NITROGEN OXIDES DECREASING COMBUSTION METHOD

This application is a continuation, of application Ser. No. 930,977, filed Nov. 13, 1986 (abandoned), which is a continuation of Ser. No. 676,936 filed Nov. 30, 1984 (abandoned).

BACKGROUND OF THE INVENTION

This invention relates to a combustion or burning method of a fuel-air mixture in a gas turbine combustor suitable for use in a gas turbine power generation system, and more specifically to a nitrogen oxides decreasing combustion method which features a low level of occurrence of nitrogen oxides (hereinafter called "$NO_x$") during combustion and good combustion efficiency and can thus be suitably applied to the catalytic combustion system.

Reflecting recent depletion of petroleum resources and other energy resources, there is a demand for various alternative energy. At the same time, there is also a standing demand for more efficient utilization of energy resources. As means capable of satisfying such demands, there are for example the gas turbine/steam turbine combined cycle power generation system and the integrated coal gasification gas turbine system/steam turbine combined cycle power generation system. Since these power generation systems enjoy higher power generation efficiency compared with the conventional power generation system relying upon steam turbines, they are expected to find commercial utility as power generation systems capable of effectively converting fuels such as natural gas and coal gasified gas, whose production is expected to increase in the future, to electric power.

For gas turbine combustors employed in the gas turbine power generation system, there has been adopted the homogeneous reaction system combustion method in which a mixture of a fuel and air is ignited by means of a spark plug or the like. One example of such combustors is illustrated in FIG. 1. In the combustor shown in FIG. 1, a fuel injected through a fuel nozzle is mixed with burning air (i.e., air for combustion) 3 and is then ignited by a spark plug 2 to undergo its combustion. The resulting gas, namely, the combustion gas is added with cooling air 4 and diluent air 5 to lower its temperature to predetermined gas turbine inlet temperature. Thereafter, the thus-cooled and diluted combustion gas is injected through a turbine nozzle 6 into a gas turbine. In the figure, numeral 8 indicates a swirler.

One of the most serious problems which the above-exemplified conventional combustor is accompanied with is that a great deal of $NO_x$ is produced upon combustion of the fuel, whereby to induce environmental pollution and the like. This occurrence of $NO_x$ is attributed to the development of a localized high-temperature zone, the temperature of which exceeds 2,000° C., in the combustor during the combustion of the fuel.

A variety of combustion methods have been studied with a view toward overcoming such a problem. The heterogeneous reaction system method making use of a solid catalyst (hereinafter called "the catalytic combustion method") has been proposed recently.

In this catalytic combustion method, a mixture of a fuel and air is caused to burn using a catalyst. According to this method, the combustion may be triggered at a relatively low temperature. This method does not require cooling or diluting air and allows to increase the amount of burning air. Thus, the catalytic combustion method has lowered the highest temperature and has hence made it possible to reduce the occurrence of $NO_x$ to an extremely low level.

FIG. 2 is a schematic illustration of one example of combustors which may be used in accordance with the above-described catalytic combustion method. In this figure, the reference numerals identify like elements of structure in FIG. 1. This combustor is equipped, as its structural feature, with a catalyst-packed zone 7.

In this catalyst-packed zone 7, a honeycomb structured catalyst for combustion is usually packed. A mixture of a fuel and air is brought into contact with the packed catalyst there, thus causing the mixture to burn through a catalytic reaction.

An exemplary temperature distribution of a gas stream and packed catalyst in a combustor, to which the catalytic combustion method has been applied, is illustrated in FIG. 3 in relation to the direction of the gas stream.

In FIG. 3, the zone A-B corresponds to a zone in which a fuel and air are mixed. A mixture, which has been formed there owing to the mixing of the fuel and air, is then brought into a packed catalyst in a catalyst-packed zone corresponding to the zones B-C and C-D. In the zone B-C, the mixture undergoes a catalytic reaction only on the surface of catalyst. Thus, the temperature of the catalyst rises like the zone B'-C' indicated by a dashed line. As a result, the temperature of the gas stream in the catalyst-packed zone also goes up. In the zone C-D, the reaction rate is increased further on the catalyst because the temperature of the stream has already increased in the zone B-C. Therefore, the temperature of the catalyst rises like the zone C'-D' indicated by a dashed line. As a result, the temperature of the catalyst becomes higher than the ignition temperature of the gas stream present in the catalyst-packed zone and the gas-phase combustion (i.e., the homogeneous reaction) also occurs in this zone. Namely, both catalytic reaction and gas-phase combustion take place simultaneously in the zone C-D. This is a typical feature of the catalytic combustion method. Finally, the stream flown out of the zone C-D travels toward the inlet of the turbine while allowing any un-burnt portion of the fuel to burn in its gas phase. This travelling takes place in the zone D-E.

It is disclosed in Japapnese Patent Publication No. 36294/1977 and U.S. Pat. Nos. 3,914,090; 3,928,961; 3,940,923; 3,982,879; 4,019,316 and 4,065,917 to the effect that in a combustion method as mentioned above, the temperature of the packed catalyst ranges from 815° to 1650° C. in the catalyst-packed zone corresponding to the zones B-C and C-D.

However, the above-proposed method is also accompanied by a problem that the temperature of the packed catalyst is required to reach a relatively high temperature in the zone C-D, in other words, the temperature of the catalyst packed in the zone C-D has to be higher than the ignition temperature of the gas stream which is brought into contact with the catalyst. When a fuel difficult to undergo gas-phase combustion, such as methane gas, is employed for example, the fuel is unable to substantially burn up unless the temperature of the catalyst is 1000° C. or higher. Therefore, a catalyst to be packed there is required to successfully withstand temperature above 1000° C. or preferably 1100° C.

Under the circumstances, no one has however succeeded to develop a catalyst capable of withstanding such high temperature to permit its utilization over a long period of time under such severe temperature conditions. Accordingly, it is extremely difficult to practice such a combustion method as illustrated in FIG. 3.

SUMMARY OF THE INVENTION

An object of this invention is to provide a catalytic combustion method which has solved difficulties of conventional catalytic combustion methods, namely, to provide an $NO_x$ decreasing combustion method capable of prolonging the service life of a catalyst while enjoying stable operation.

The present inventors found, as conditions for causing a stream flown out of a catalyst-packed zone to undergo gas-phase combustion, that (1) the temperature of the flown-out stream is sufficiently high or (2) the concentration of a fuel in the flown-out stream is high. They also paid attention to the fact that in the conventional catalytic combustion method, both catalytic reaction and gas-phase combustion are caused to occur at the same time in the zone C-D to raise the temperature of the resulting stream, namely, the condition (1) is solely satisfied. Changing the viewpoint from the conventional combustion method, the present inventors conceived that the gas-phase combustion may be triggered even with a flown-out stream of a low temperature and a fuel can be burnt up with decreased $NO_x$ occurrent without going through the zone C-D if an additional fuel is incorporated in the stream flown out of the catalyst-packed zone so as to increase the fuel concentration in the flown-out stream, in other words, if the condition (2) is fulfilled. The present inventors have carried out an extensive research on the basis of the above concept, leading to completion of this invention.

Accordingly, the present invention provides an $NO_x$ decreasing combustion method which comprises the following consecutive steps:

(1) mixing a fuel and air with each other;

(2) bringing a mixture, which has been obtained in the the first step, into contact with a packed catalyst so as to cause a portion of the mixture to burn only through a catalytic reaction; and (3) adding a fresh supply of the fuel to a stream obtained from the second step to form a mixed gas and causing the mixed gas to undergo non-catalytic thermal combustion;

The temperature of said packed catalyst being lower than the ignition temperature of the mixture and the adiabatic flame temperature, namely a temperature reaching when complete combustion has undergone, of said mixed gas being lower than a temperature at which $NO_x$ occur.

In the the first step, an oxidizing gas such as concentrated oxygen may be used as the air or the mixture may be diluted further using a substantially inert gas such as nitrogen or the like. It should be borne in mind that the non-fuel fraction of the mixture formed in the first step is often referred to as "air" in the present invention.

DESCRIPTION OF THE PREFERRED EMBODIMENTS

Figure 3:
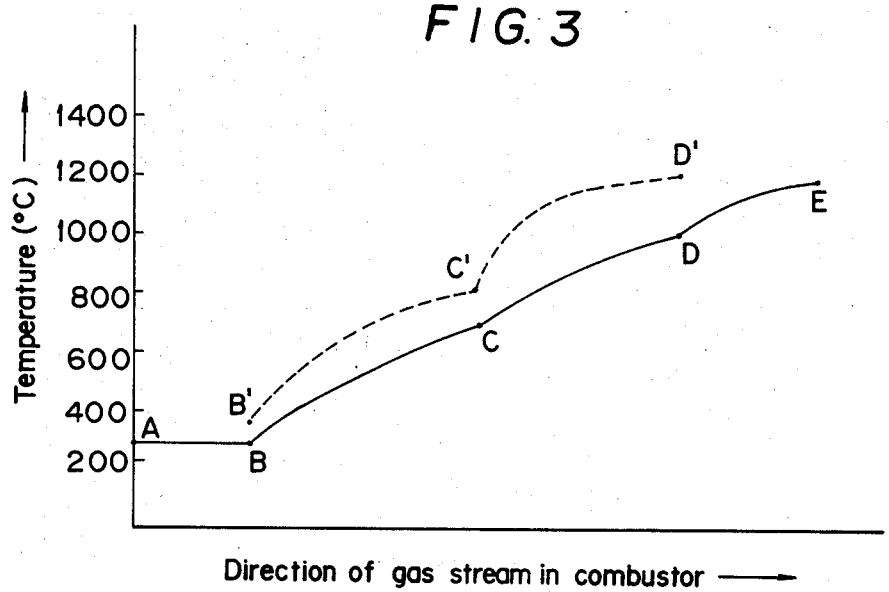
FIG. 3 shows catalyst temperature distribution and gas stream temperature distribution in a conventional catalytic combustion method.
Figure 4:
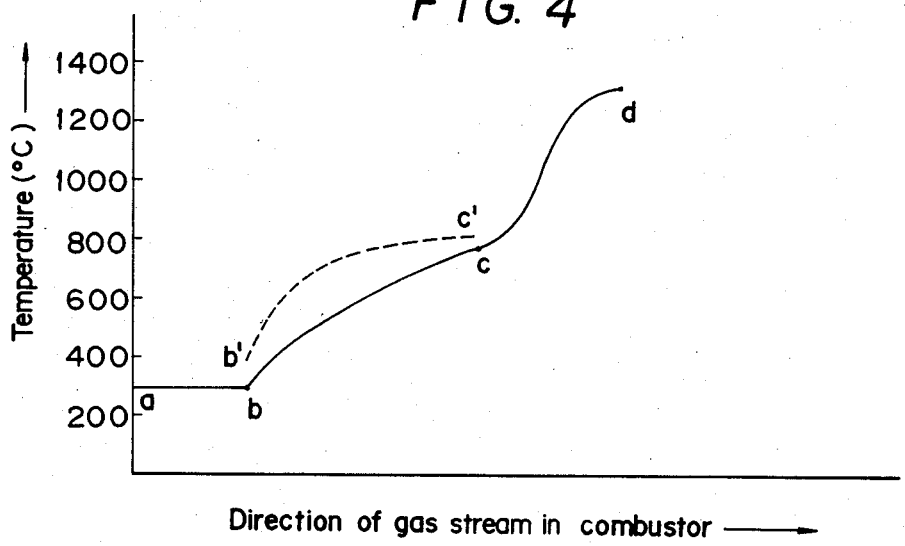
FIG. 4 shows catalyst temperature distribution and gas stream temperature distribution in the combustion method according to this invention.

The temperature distribution of the gas stream and catalyst along the direction of the gas stream in the combustion method of this invention is shown in FIG. 4, in the same manner as in FIG. 3.

First of all, the first step proceeds in the zone a-b in the figure. Namely, a fuel and air are mixed there into a mixture.

Figure 5:
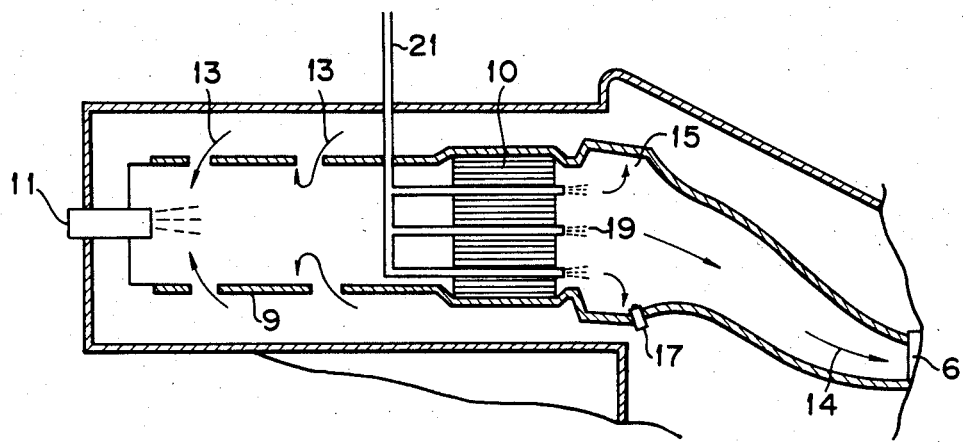
FIGS. 5-7, 9, 12, 14-21, 24a-26, 28-32 and 35-38b are schematic sectional illustrations of combustors embodying this invention.
Figure 6:
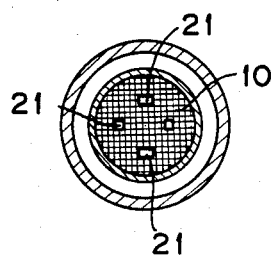

Thereafter, the mixture flows into the catalyst-packed portion in the second step. Here, the mixture is brought into contact with the packed catalyst to undergo a catalytic reaction. Thus, the temperature of the gas stream in the catalyst-packed zone rises (as shown by the zone b-c in the drawing), reflecting the temperature increase of the catalyst (indicated by the zone b'-c' in the drawing). The resulting hot gas stream flows out of the catalyst-packed portion. The zone c-d represents a temperature increase occurred owing to the gas-phase combustion subsequent to the flowing-out of the hot gas stream from the catalyst-packed zone. This combustion will next be described more specifically with reference to the schematic view shown by way of example in FIG. 5. Burning air 13 which has been pressurized and heated by a compressor or the like is mixed with a fuel 11 fed through a fuel nozzle or the like, whereby to form a mixture. This mixture is then fed to a packed catalyst 10. A portion of the fuel burns there through a catalytic reaction and the temperature of the catalyst rises up to about 900° C. at the maximum. At such low temperature as about 900° C., a fuel, which is difficult to burn, such as methane gas does not undergo gas-phase combustion in the catalyst-packed zone. A fuel 19 is additionally supplied to the stream flowing out of the catalyst so that a mixed gas is formed. In FIG. 5, the fresh supply of the fuel 19 is heated prior to its mixing with the flown-out stream by feeding the fuel 19 through pipes 21 which are in turn arranged through the catalyst, whereby facilitating the combustion in the third step. When sectionally viewed, the pipes 21 are arranged through the catalyst as shown in FIG. 6, for example. The illustrated combustor is also provided with an enlarged portion 15, where the stream of mixed gas is allowed to flare outwardly so that the mixed gas is mixed, flown back and/or flow-stagnated further to enhance its uniformity. Then, the resultant mixed gas is readily allowed to undergo thermal combustion by means of an ignitor stick 17 or the like or through its natural ignition.

Here, it is necessary that the temperature of the packed catalyst is lower than the ignition temperature of the mixture. If the former temperature should be higher than the ignition temperature, gas-phase combustion will take place in the catalyst bed in addition to the above-mentioned catalytic reaction, whereby promoting the thermal deterioration of the catalyst. It is generally preferred to keep the temperature of the packed catalyst within the range of 300° to 900° C. although it may vary depending on each catalyst to be packed there. The catalyst temperature can be determined by making suitable selection as to the type and shape of a catalyst to be used, the flow velocity of the mixture, the concentration of the fuel.

Any catalysts such as conventional platinum catalysts may be used as catalysts to be packed in the practice of the method of this invention. As a preferred example, a honeycomb-structured catalyst supporting palladium as its principal catalytic component may be mentioned. This honeycomb-structured catalyst will next be described in detail. The activity of palladium as a catalyst has already been found to be attributable primarily to palladium oxide (PdO). Palladium is at such an equilibrium as expressed by the following formula:

This equilibrium is governed by temperature and oxygen partial pressure. The reaction, $PdO \rightarrow Pd + \frac{1}{2}O_2$ becomes more dominant as the temperature rises and/or the oxygen concentration drops. Thus, the amount of PdO decreases, resulting in a reduction to its catalytic activity. Accordingly, the temperature of the catalyst does not increase beyond a certain level so long as a catalyst consisting principally of palladium is used. This temperature is considered to be around 900° C. under conditions such as those encountered, for example, in a gas turbine combustor. This is thus suitable because the temperature of the catalyst does not increase excessively beyond the required level and the thermal deterioration of the catalyst is hence minimized. Furthermore, depending on the type of a fuel to be used, the catalyst consisting principally of palladium may not require preheating of the mixture and thus permits omission of heating such as precombustion or the like as needed, because the catalytic reaction may take place even at temperatures as low as the burning air temperature elevated by adiabatic compression by the compressor or the like.

In the the third step, a prescribed amount of the fuel is additionally added to the stream which has flown out of the catalyst-packed zone and has been heated to a predetermined level. The resultant mixed gas is then caused to undergo complete and stable gas-phase combustion.

Here, it is necessary to control the adiabatic flame temperature of the mixed gas at a temperature substantially lower than the temperature at which $NO_x$ occur. Otherwise, $NO_x$ are allowed to occur, whereby failing to fulfill the objects of this invention. This temperature control can be carried out with ease by making suitable selection as to the amount of a fuel to be added, the flow velocity of the flown-out stream or mixed gas, the manner of injection of the added fuel, the structure of the combustor, and so on.

It is convenient to provide a zone, which reduces the flow velocity of the flown-out stream or mixed gas or even causes the flown-out stream or mixed gas to flow back, in the place where the the third step is allowed to proceed, because such a zone allows the thermal combustion to proceed readily. It is also effective to provide an ignition source there, because it facilitates the initiation of the gas-phase combustion of the mixed gas.

In order to prohibit occurrence of gas-phase combustion in the catalyst-packed zone upon practice of the method of this invention, it is necessary to determine combustion conditions by making suitable selection as to either one, some or all of reaction parameters such as catalyst, fuel, the length of catalyst bed, the gas flow velocity at the inlet of the catalyst-packed zone, the gas temperature at the inlet of the catalyst-packed zone, fuel concentration, etc. When a fuel is used by way of example along with a catalyst having certain activities, it is necessary to known in advance conditions, under which no gas-phase combustion takes place in the catalyst-packed zone, by varying the above-mentioned parameters in an experiment and then to design a combustor and to operate same under such conditions.

The above-mentioned various conditions cannot be determined independently. However, they may inter alia be standardized in nature as follows:

(1) To avoid use of a catalyst bed having a length in excess of a necessary length, because an unduly long catalyst bed tends to induce gas-phase combustion in a latter part thereof;

(2) To avoid use of a gas temperature exceeding a necessary level at the inlet of the catalyst bed for the same reasons;

(3) To avoid use of a gas flow velocity lower than a necessary level at the inlet of the catalyst bed for the same reasons; and (4) To avoid use of a fuel concentration higher than a necessary level for the same reasons.

More specifically, it is preferred to employ a catalyst bed length of 3 to 15 cm, a gas temperature of 250° to 500° C. at the inlet of the catalyst bed, a gas flow velocity of 15 to 40 m/sec at the inlet of the catalyst bed, and a fuel concentration so controlled as to keep an adiabatic flame temperature of 700° to 1300° C. as when the fuel has been burnt.

Compared with conventional combustion methods, the combustion method of this invention has, for example, the following merits and its industrial value is thus extremely large:

(1) It permits omission of the zone C-D (where a catalytic reaction and gas-phase combustion take place concurrently) in the conventional combustion methods. Therefore, it is possible to shorten the length of the catalyst-packed zone and hence to reduce the pressure loss therethrough.

(2) The catalyst-packed zone does not contain the zone C-D, namely, the high-temperature zone. Hence, it is possible to avoid the thermal deterioration of the packed catalyst and hence to improve the durability of the packed catalyst to a significant extent.

(3) Owing to a dominant proportion of the gas-phase combustion, it can readily follow variations of turbine load or the like.

(4) It can control the thermal combustion temperature of the flown-out stream at a level lower than the $NO_x$-producing temperature. Therefore, it is feasible to reduce the amount of $NO_x$.

EXAMPLE 1

Figure 7:
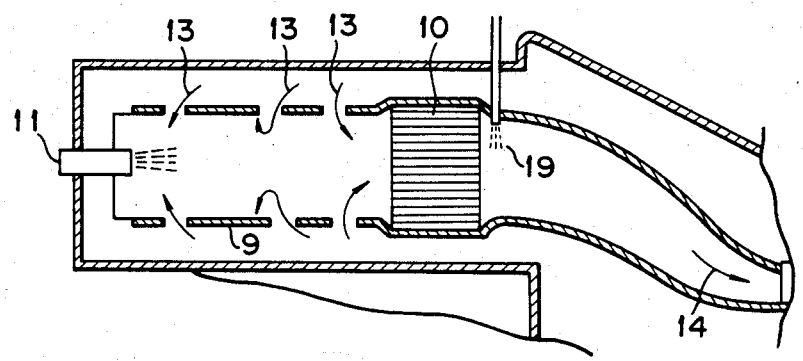

A combustor shown schematically in FIG. 7 was fabricated, and a honeycomb-shaped catalyst 10 containing palladium oxide as its principal component was packed in a combustion cylinder 9. The diameter and length of the catalyst were 30 mm and 9 cm respectively. A fuel 11 and air 13 were respectively fed through their respective feed lines into the combustion cylinder 9, in which they were mixed together. The resultant mixture was caused to flow into the catalyst 10. The gas flow velocity at the inlet of the catalyst was 26 m/sec. A fuel 19 was added to a stream flown out of the catalyst 10. The resultant discharge gas 14 was sampled and its composition was measured to determine the combustion efficiency. By the way, the air 13 was pre-heated to 400° C. The flow rates of the air 13, fuel 11 and fuel 19 were respectively 450 Nl/min., 9 Nl/min., and 4 Nl/min. As the fuels 11, 19, natural gas was used.

Following the procedures of the above experiment except that the length of the catalyst was 17 cm, the flow rates of the fuel 11 and air 13 were respectively 13 Nl/min. and 450 Nl/min. and the fuel 19 was not charged, the conventional catalytic combustion method was carried out for the sake of comparison in the same apparatus as that used above. The pre-heating temperature of the air was 500° C.

Figure 8:
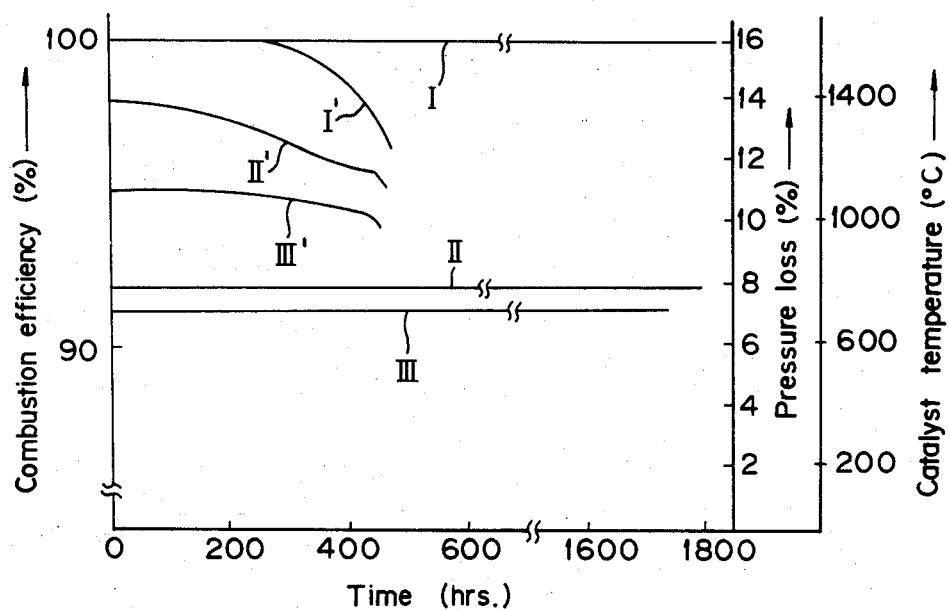
FIGS. 8, 11, 13, 22, 23, 27, 33, 34 and 39 show certain characteristics obtained in the combustion methods including those according to various embodiments of this invention.

In each of the above experiments, the combustion efficiency, catalyst temperature and pressure loss across the catalyst-packed zone were measured to investigate their variations along elapsed time. Measurement results are shown in FIG. 8, in which I, I' indicate respectively the combustion efficiencies in the method of this invention and the conventional method, II, II' correspond respectively to the catalyst temperatures in the method of this invention and the conventional method, and III, III' identify the pressure losses in the method of this invention and the conventional method.

By the way, the amount of produced $NO_x$ was 2 to 3 ppm during the period of the experiment in the present invention.

EXAMPLE 2

Figure 9:
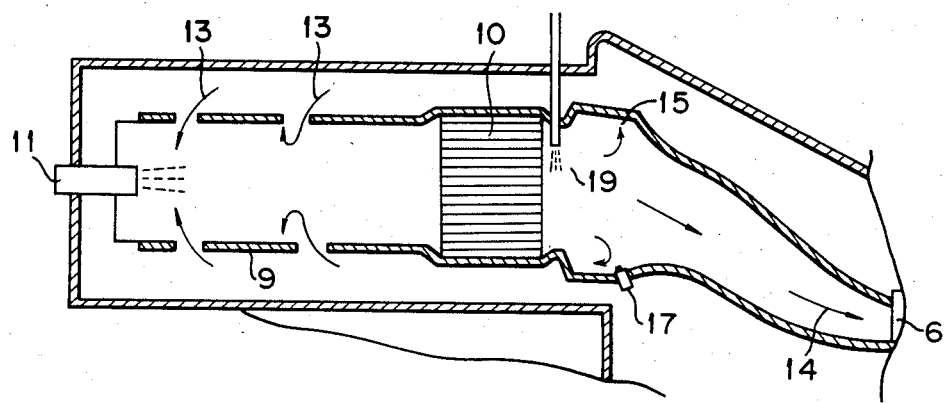

Fabricated was a combustor of FIG. 9, which contained a honeycomb-shaped catalyst-packed zone having a diameter of 100 mm and a length of 10 cm and containing palladium oxide as its principal component. This combustor was provided, at a location downstream a catalyst-packed zone 10, with a portion 15 at which the stream of the mixed gas expanded. This portion 15 served as a back-flow zone or stagnation zone for the stream of the mixed gas. An ignitor stick 17 is arranged in the portion 15, whereby making up an ignition source. The catalyst was heated at 800° C. for 5000 hours in an electric furnace prior to its use in an experiment. The flow rates of a fuel 11, fuel 19 and air 13, which had been pre-heated to 350° C., were 100 Nl/min., 40 Nl/min., and 4.8 Nm³/min, respectively. The gas flow velocity at the inlet of the catalyst was 23 m/sec. The fuel 19 was added in portions at three locations.

After introduction of the fuels and air, sparks were produced from the ignitor stick 17 so as to allow the mixed gas to burn up completely. Then, the ignitor switch 17 was pulled out. Upon an elapsed time of 1 hour from the ignition, the combustion efficiency and the amount of produced $NO_x$ were at least 99.9% and 3 ppm respectively. On the other hand, the maximum temperature of the catalyst was 780° C. From the above fact, it was estimated that an operation of 5000 hours or longer would be feasible.

EXAMPLE 3

Using such a prototype combustor as depicted in FIG. 5, a fuel 11 and burning air 13, the latter having been pre-heated to 420° C., were mixed respectively at flow rates of 92 Nl/min. and 4.8 Nm³/min. in a first step. In a second step, the resultant mixture was fed to a honeycomb-shaped catalyst 10 packed in the combustor, containing palladium as its principal component, and having a diameter of 100 mm and a length of 9 cm at a gas flow velocity at the inlet of the catalyst being 26 m/sec. In a third step, a fuel 19 was supplied at 40 Nl/min. to locations immediately downstream the catalyst through pipes 21 which extend through the catalyst. Then, sparks were given off from a spark plug 17 to burn up the resultant gas mixture completely. Thereafter, the spark plug 17 was pulled out.

Figure 10:
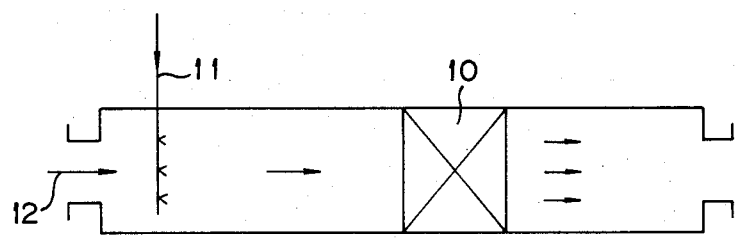

As a comparative example, a prototype combustor similar to the combustor illustrated in FIG. 10 was employed to conduct the conventional catalytic combustion. A catalyst containing palladium as its principal component and having a diameter of 100 mm and a length of 9 cm was packed at the former-stage side, while a catalyst containing platinum as its principal component and having a diameter of 100 mm and a length of 9 cm was packed at the latter-stage side. Then, a fuel 11 and air 12, the latter having been pre-heated to 500° C., were charged respectively at 132 Nl/min. and 4.8 Nm³/min at the catalyst inlet gas flow velocity of 29 m/sec.

Figure 11:
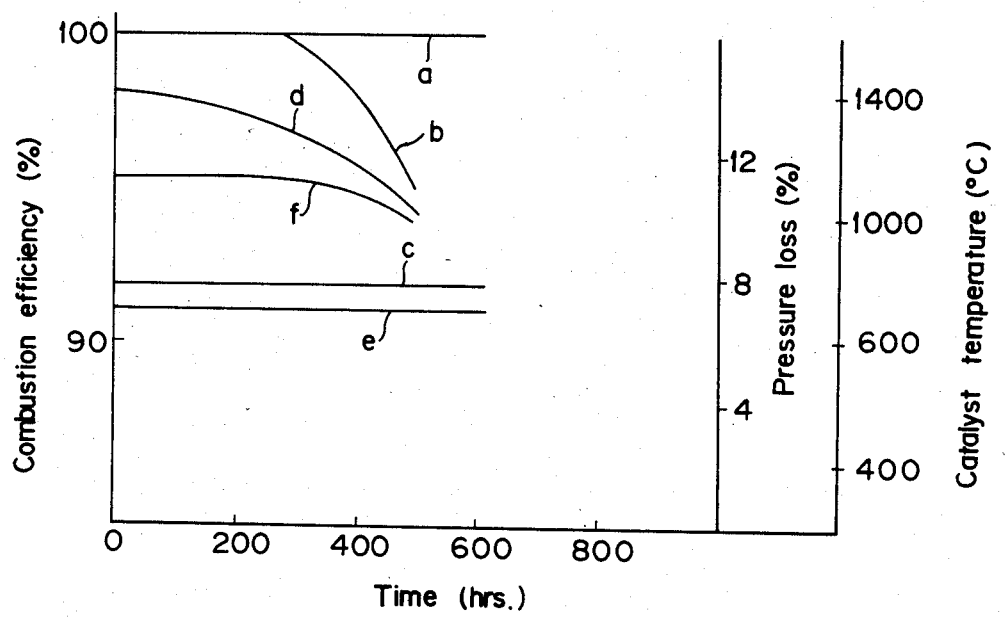

The fuel used in both the experiments were natural gas. Results of these experiments are shown in FIG. 11, in which a indicates the combustion efficiency of this invention, b the combustion efficiency of the conventional method, c the catalyst temperature in the present invention, d the catalyst temperature in the conventional method, e the pressure loss in the present invention, and f the pressure loss in the conventional method. As readily envisaged from FIG. 11, this invention permits stable combustion over a long period of time while minimizing the pressure loss. By the way, the amount of $NO_x$ produced during the experiment was 2 to 3 ppm.

The objects and advantages of this invention may be achieved more successfully by providing at least one of the following means with the combustor.

(a) Incorporation of steam in the gas stream after its passage through the catalyst bed, in addition to the fresh supply of the fuel:

After completion of the above-mentioned second step, an auxiliary fuel consisting principally of the fresh supply of the fuel and steam is added to the stream flown out of the catalyst bed so as to form a composite gas. The composite gas is then caused to burn through a gas-phase reaction, thereby achieving the stabilization of its combustion (see, Examples 4 to 6 including FIGS. 12 to 14 which will be described herein).

(b) Addition of steam to the mixed gas prior to its passage through the catalyst bed:

The objects of this invention can be achieved more readily by incorporating steam in the mixed gas of the fuel and air, which mixed gas is to be supplied to the catalyst-packed portion. It has not been fully elucidated why the incorporation of steam is effective. It may presumably be contemplated that the addition of steam is effective for the prevention of the gas-phase reaction in the catalyst bed. The steam may be mixed with the fuel in advance or may be added directly to the mixed gas. It is necessary to determine in advance the amount of steam, which is to be added, through an experiment while taking the kind of the fuel, the kind and shape of the catalyst, etc. into consideration. It may generally range from about 0.1 to about 0.5 by weight ratio based on the fuel.

Figure 14:
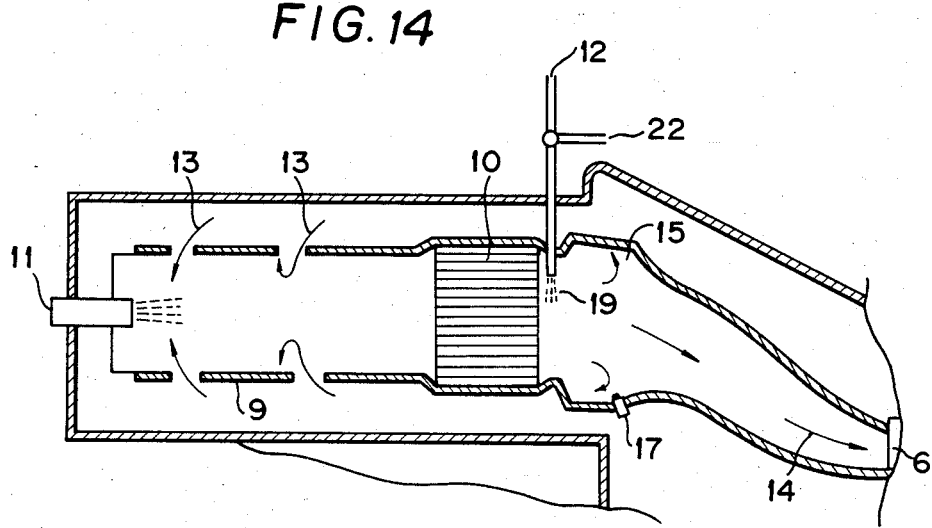
Figure 15:
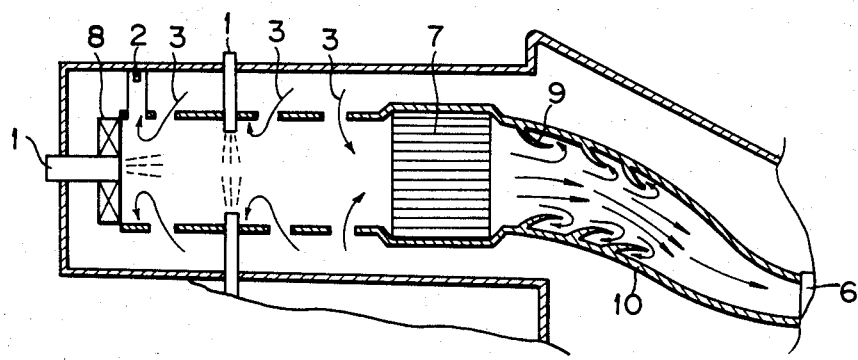

(c) Provision of a back-flow means or flow-stagnation means at a portion downstream the catalyst bed of the combustor:

As has already been shown in FIGS. 5, 9 and 14, the portion identified by the numeral 15 serves as a back-flow zone or stagnation zone for the stream of the mixed gas. As another embodiment thereof, the back-flow or stagnation of the gas stream may be produced by providing a means as shown in FIG. 15. In FIG. 15, numerals 1 to 8 correspond to the elements shown in FIG. 2. Numeral 9 denotes structures taking shapes of baffle plates, arranged arround inner wall of a combustion gas flow-out tube 10 in protuberant fashions. The structures 9 obstruct smooth flow of the combustion gas flown out of the catalyst bed 7. Then, a part of the combustion gas flowing along the inner wall of the gas flow-out tube 10 is turned inward to the structures 9 to cause the back-flow or delay the average velocity of the gas.

In the zones where the back-flow of the gas or the like takes place, the gas flow velocity becomes slower than the flame propagation rate, and therefore the fuel remained un-burnt in the combustion gas is burnt to form a flame. And, owing initiatively to these zones, the gas-phase combustion undergoes in high efficiency at the portion downstream the catalyst bed 7.

Figure 16:
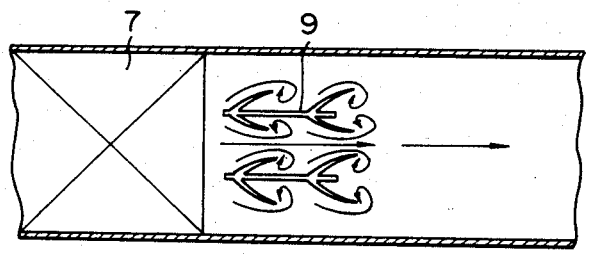
Figure 17:
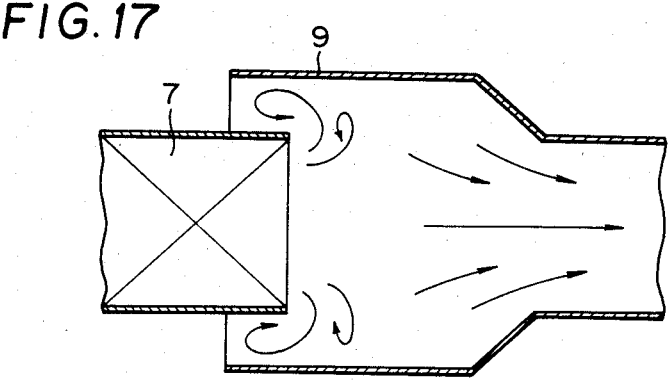
Figure 18:
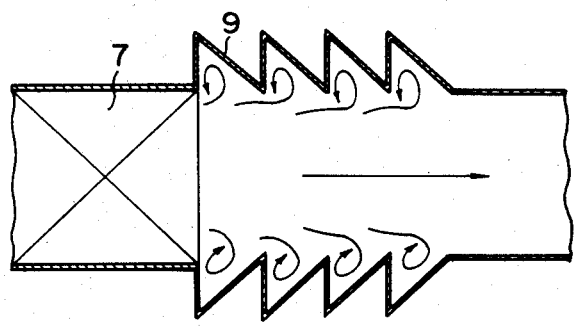

Such zones mentioned above may not be limited to those formed as exemplified in FIG. 15. They may be formed by structures as schematically illustrated in FIGS. 16 to 18 and which are to be provided at the portion downstream the catalyst bed. Namely, in FIG. 16, there are shown structures 9 provided within the stream of combustion gas and taking shape of a tree having a plural number of branches. The gas flows are forced to turn around the branches as shown in the arrows in the figure to form the back-flow or a stagnation area. In FIG. 17, the backflow means or the stagnation means is constituted by a structure 9 comprising a gas flow-out tube having a cross section larger than that of the catalyst bed 7, and in FIG. 18, it is exemplified by making a portion downstream the catalyst bed 7 to have structures 9 of the shapes of triangle roofs. In either of these embodiments, gas flow is disturbed to form the back-flow or the stagnation area as shown by the arrows in these figures.

Figure 19A:
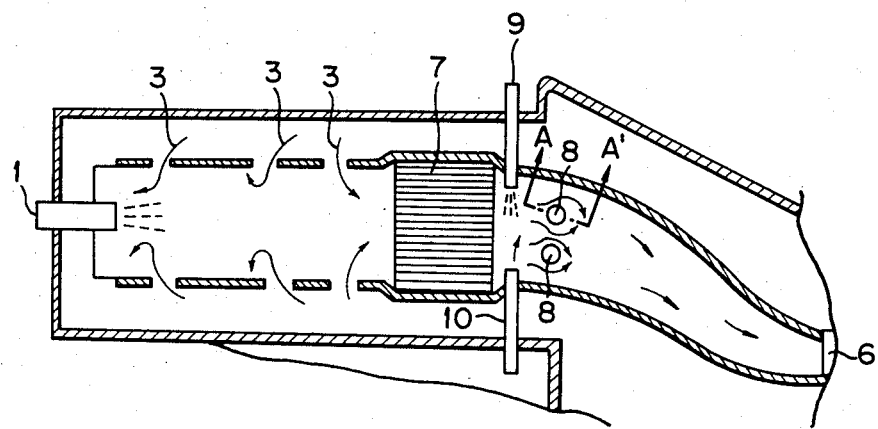

(c)' Provision of a swirl- or gyration-forming means at a portion downstream the catalyst bed of the combustor:

(i) Installation of a non-streamline body:

By providing a non-streamline body 8, shown in FIG. 19a at a portion downstream the catalyst bed at which portion gas-phase combustion takes place, the composite gas flown out of the catalyst bed develops a swirl. This swirl forms a closed circulation zone. While the surrounding un-burnt mixed gas is partly taken in the closed circulation zone and is stirred there, the combustion proceeds to form a combustion gas of a high temperature. This combustion gas of the high temperature heats the surrounding un-burnt mixed gas further and at the same time, provides active chemical species. Thus, the combustion gas of high temperature serves as an ignition source and exhibits flame-maintaining effects.

Furthermore, the provision of heating means with the non-streamline body 8 allows the non-streamline body 8 to serve as an ignition source for initiating the gas-phase combustion in the zone downstream the catalyst bed. It is possible to raise the temperature of the mixed gas to a level at which the above-mentioned gas-phase combustion takes place in the zone downstream the catalyst bed, by heating the fuel only through its combustion in the catalyst bed upon initiation of the combustion. However, keeping of the catalyst bed to an elevated temperature increases the load to the catalyst bed and thus deleteriously affects the service life of the catalyst. Therefore, it is desirable to provide an ignition source in a zone downstream the catalyst bed. The non-streamline body equipped with heating means is preferred as an ignition source which can additionally exhibit preheating effects. Even when a temperature drop occurs and combustion is about to cease due to a variation in the composition of the fuel and air or its flow velocity in the course of combustion, it is still possible to avoid the cessation of combustion by heating the mixed gas by the heating means.

Figure 19B:
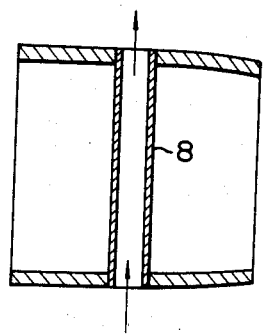

The non-streamline body may be of any shape so long as it can produce a swirl in the zone downstream the catalyst bed whenever necessary. Non-streamline bodies 8 shown in FIGS. 19a and 19b have a cylindrical shape. Besides, it may be possible to choose for example a spherical, conical or V-like shape while taking various other conditions into consideration. It may be possible to use a single non-streamline body or alternatively, a plurality of non-streamline bodies. In some instances, the non-streamline bodies may be placed at locations upstream the auxiliary fuel injector or the like, provided that they are located downstream the catalyst bed. A heat-resistant material is required for such non-streamline bodies. For example, a non-metallic material formed principally of silicon carbide may be used. (see, Examples 7 and 8 which will be given herein.)

Figure 20A:
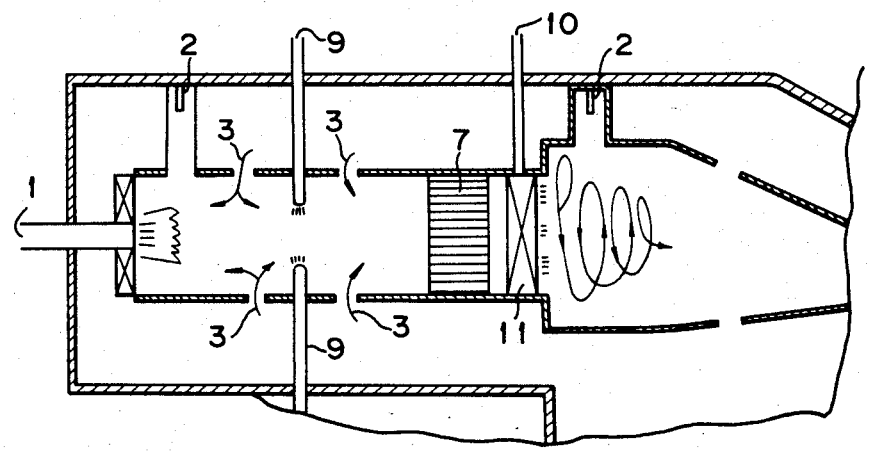

(ii) Provision of swirler:

It is possible to provide a swirler 11 as shown in the fragmentary, schematic, cross-sectional view of FIG. 20a. In FIG. 20a, a fuel injected through a fuel nozzle 1 is ignited by a spark plug 2 to subject it to pre-burning. Another supply of the fuel is then fed through a fuel nozzle 9. Thus, a mixture heated to a temperature at which catalyst works effectively is formed. This mixture is thereafter fed to a catalyst-packed zone. An auxiliary fuel 10 which is added additionally to the zone downstream the catalyst bed flows through the interior of a swirler provided as mixing means and blows out through small holes 13 formed in the surfaces of blades 12 of the swirler 11 as illustrated in the fragmentary view of FIG. 20b. (see, Examples 9 and 10 including FIGS. 21 to 23, which will be given herein.)

Figure 24A:
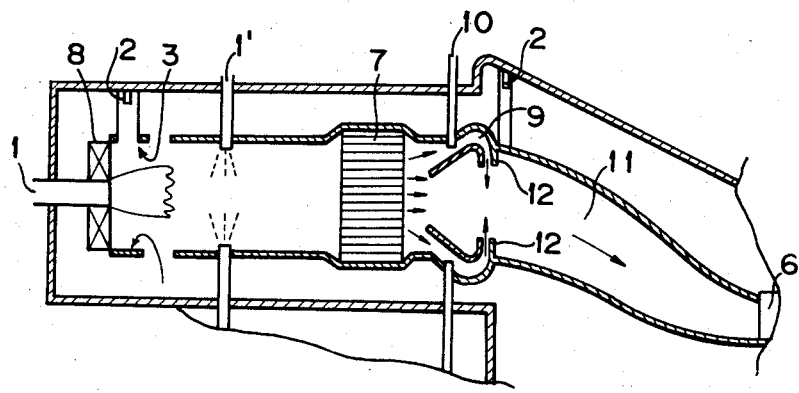
Figure 24B:
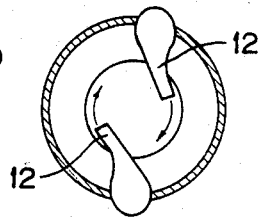

(iii) Provision of swirl-forming nozzles:

A swirl may also be produced in the zone downstream the catalyst bed by providing swirl-forming nozzles 12 as illustrated in FIGS. 24a and 24b. In FIG. 24a, numeral 9 indicates a swirl-producing zone. A transverse crosssectional view showing the nozzle 12 viewed from a point downstream the swirl-producing zone 9 is given in FIG. 24b. It is preferred to provide the nozzles 12 in pair as depicted in FIG. 24b. Preferably, the tips of the nozzles 12 open in the directions of their corresponding tangents relative to the wall of the swirl-producing zone 9. In the combustor shown in FIG. 24a, burning air 3 and a fuel, which has been fed through a fuel nozzle 1', are combined together into a mixture, which passes through a catalyst-packed zone 7. Owning to a catalyst packed in the catalyst-packed zone 7, a portion or substantially all the portion of the mixture is caused to burn and then flows out of the catalyst-packed zone. A portion of the flown-out stream flows into the feed port of the swirl-forming zone 9 according to this invention. On the other hand, an auxiliary fuel is added to the portion of the flown-out stream through an auxiliary fuel nozzle 10. The resulting mixture, which contains the auxiliary fuel added thereto, is fed through the nozzles 12, in the directions of the tangents relative to the wall of the swirl-producing zone 9, to a combustion chamber 11, where it forms a swirl. Thereafter, the mixture is ignited by a spark plug 2 in order to induce non-catalytic gas-phase combustion.

Figure 25A:
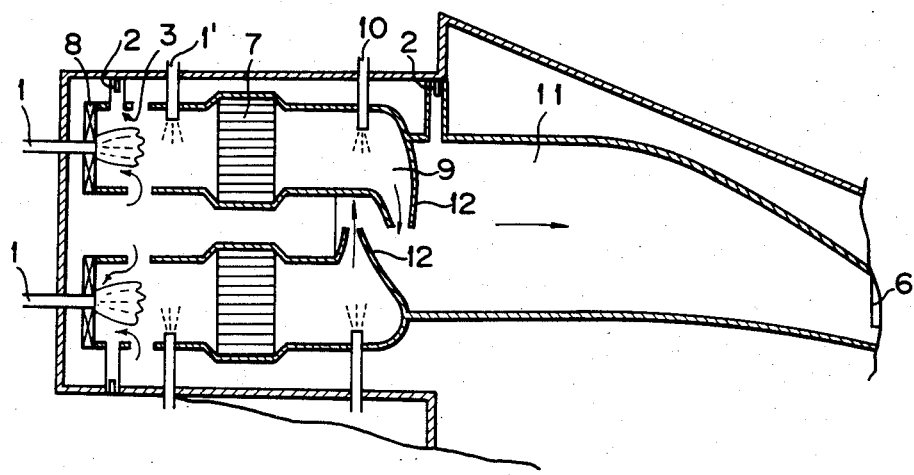
Figure 25B:
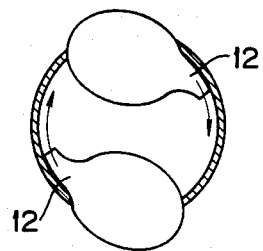

FIG. 25a illustrates another exemplary structure. FIG. 25b is a transverse cross-sectional view showing swirl-forming nozzles 12 seen from a point downstream a swirl-producing zone 9. In FIGS. 25a and 25b, like reference numerals identify like elements of structure in FIG. 24a. Similar to the embodiment shown in FIGS. 24a and 24b, the tips of the swirl-forming nozzles 12 open in the directions of their corresponding tangents relative to the wall of the swirl-producing zone 9. The combustion in a catalyst-packed zone 7 is effected in a plurality of mutually-independent combustion chambers. Streams flown out of their respective catalyst-packed zones flow in the directions of their corresponding tangents relative to the walls of their respective combustion chambers into a combustion chamber 11, and forms a swirl there.

By feeding a flown-out stream having high swirling energy into the combustion chamber as mentioned above, a circulation zone is formed near the central axis of the combustion chamber. The circulation zone extends toward the discharge port of the combustion chamber. The circulation zone exhibits flame-retaining effects, thereby to maintain a flame stably throughout a wide combustion zone. Owning to the resultant swirl, the mixing of the auxiliary fuel and the stream flown out of the catalyst-packed zone is promoted, and the occurrence of NOx due to development of localized high temperatures, which are generally caused by insufficient mixing, can thus be successfully avoided. In addition, the pressure loss which affects significantly the efficiency of each gas turbine may be minimized to an ignorable level since the combustion chamber does not contain any obstacles which may impede the flow through the combustion chamber.

In the illustrated embodiment, two nozzles are employed. The number of nozzles should rather be determined in accordance with the size of each combustor, the diameter of each nozzle, etc. It is desirable to use two or more nozzles for obtaining a stream having high swirling energy. (see, Example 11 including FIGS. 26 and 27, which will be given herein.)

Figure 28:
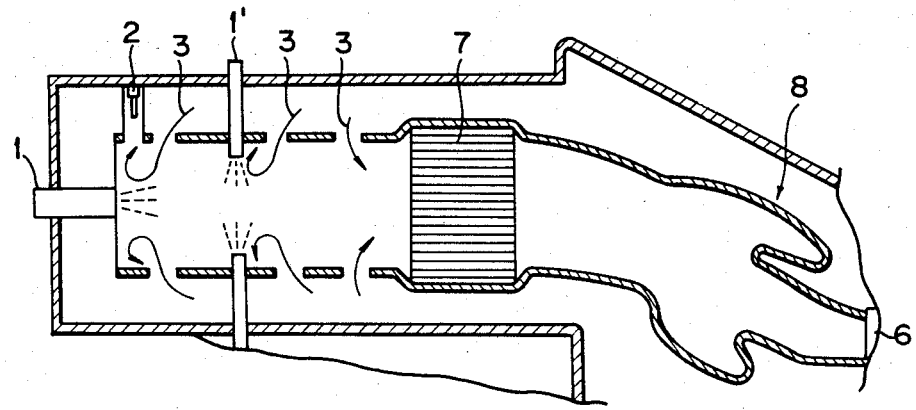

(d) Provision of a dust-collecting section in the zone downstream the catalyst bed:

When a catalyst member is broken into flying fragments in a combustor suitable for use in the practice of the catalytic combustion method, most of the flying fragments strike, due to their inertia forces, against the wall of their flow passage at locations where the flow passage is bent because the specific gravity of the catalyst member is usually higher than that of the combustion gas. Therefore, it is possible to prevent such flying fragments from flowing into a turbine if a dust-collecting section 8 branched out from the flow passage is provided, as shown in FIG. 28, at a location where the flying fragments strike against the wall of the flow passage, since the flying fragments enter the dust-collecting section 8 and settle down to the bottom of the dust-collecting section 8 by virtue of their own weights. Where the specific gravity of the catalyst member is considerably higher than that of the combustion gas, fragments of a broken catalyst member flow along a lower wall of a flow passage. These fragments are also caught in the duct-collecting section 3.

By the way, it is necessary to make the size of the dust-collecting section to such a level that fragments, which have been caught by the dust-collecting section, do not scatter again. Its exact dimensions can be determined depending on the structure of the combustor, combustion conditions, the material of the catalyst member, the minimum particle size to be caught, etc. (see, Example 12 including FIG. 29 which will be described herein.)

(e) Provision of a back-fire preventive means in the zone downstream the catalyst bed:

A back-fire preventive means may take any structure so long as it can make the flow velocity of the flown-cut stream equal to or faster than the flame propagation velocity. It may be contemplated to increase the flow velocity of each flown-out stream (type 1) or to lower the flame propagation velocity (type 2).

As type 1, it may be contemplated, for example, to make the cross-sectional area of a flow passage smaller. This structure can certainly increase the flow velocity. On the other hand, it may be contemplated as type 2 to employ such a structure that the flown-out stream forms a laminar flow. Provision of a filter of honeycomb structure having a larger opening proportion, for example, is capable of making the flown-out stream laminar without any change in the flow velocity. The flame propagation velocity is lower in the flow of laminar state than a flow of turbulent state. Therefore, the first-mentioned object can be achieved.

Figure 30:
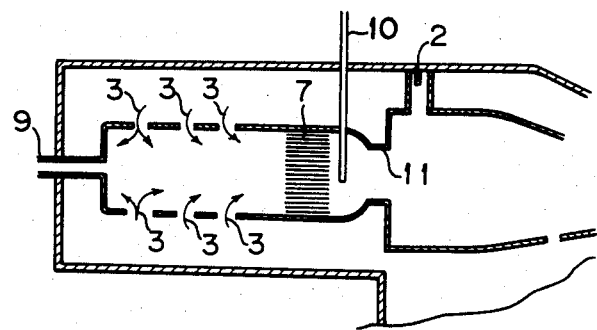
Figure 31:
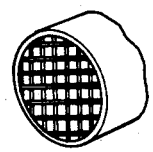

One structural example of combustors according to this embodiment is illustrated in FIG. 30, in which the flow passage is squeezed in area at a location indicated by numeral 11 (back-fire preventive mechanism). In the combustor illustrated in FIG. 30, burning air 3 is mixed in a first step with a fuel fed through a fuel nozzle 9 (mixing zone). The resultant mixture passes through a catalyst-packed zone 7 (catalytic combustion zone) in a second step. After causing a portion or almost all the portion of the fuel to burn up, a fresh supply of the fuel is added through a fuel nozzle 10 (feeding zone of additional fuel) in a third step and the fuel is ignited by an ignition plug 2 provided in the downstream as needed. The resulting flame propagates toward the upstream side of the stream. However, this flame cannot propagate to the upstream side owning to the provision of the back-flow preventive system. Accordingly, it is possible to avoid localllized occurrence of such a high temperature as permitting the generation of $NO_x$ at high concentrations by setting the distance between the fuel nozzle (the feeeding zone of additional fuel) and the squeezed point, where the flow passage has a smaller cross-sectional area, at a suitable length and mixing the fuel sufficiently. It may also be feasible to provide at the location, where the flow passage is squeezed, a honeycomb structure of such a cell diameter that the gas stream can pass as laminer flows through the cells instead of reducing the cross-sectional area of the flow passage at the location 11. One example of such a honeycom structure is illustrated in FIG. 31. The diameter of each cell may be freely set in accordance with the type of the fuel, operational conditions, etc. (see, Examples 13 and 14 including FIGS. 32 to 34, which will be described herein.)

Figure 35:
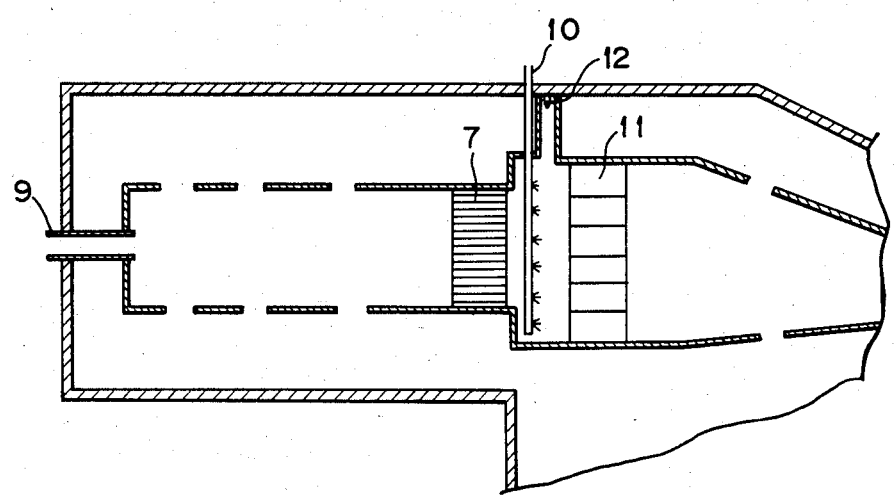
Figure 36:
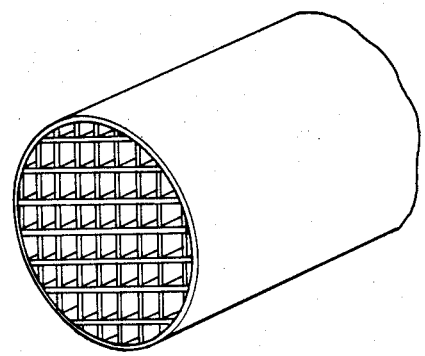

(f) Provision of a flame-holding means equipped with a plurality of flow passages in a zone downstream of the catalyst bed:

As such flame-holding means, may be mentioned a bundle of pipes as indicated at numeral 11 in FIG. 35 or a honeycomb structure depicted in FIG. 36 and usable in place of the bundle of pipes indicated at numeral 11 in FIG. 35. It is preferred to employ, as the material for the flame-holding means, a material having high heat resistance and heat capacity. It is preferred for example to use ceramics such as $Al_2O_3$ and $ZrO_2$. Although it has not been fully elucidated why the flame-holding effects have been brought about by the present embodiment, the flame-holding effect which permits maintenance of stable combustion seems to have been brought about because in the catalyst-packed zone, the temperature of the flown-out stream has already been raised and when the combustible gas having an increased fuel concentration passes through the flow passage of the flame-holding structure of this embodiment, its combustion is accelerated by the energy obtained by radiation at the inner surface of the flow passage, convection and the like. By the way, the energy produced in the flow passage of the flame-holding structure may be considered to have occurred as a result that the high-temperature gas, which burnt in a latter part of the flame-holding structure, has heated the latter part of the flame-holding structure and the resultant heat has been transmitted to a former part of the flame-holding structure. Needless to say, this effect does not occur from the initiation of the combustion. In the beginning, it is necessary to give external energy forcedly so that the combustion is initiated. As means for giving energy forcedly, it may be contemplated to use an ignition source such as spark plug, an auxiliary burner, or the like. Namely, once combustion starts in the flame-holding structure having a pluruality of such flow passages, stable combustion, namely, a stable gas-phase reaction will then continue in accordance with the above-described mechanism.

The effects of the above-mentioned flame-holding structure can be brought about when the relative diamter (i.e., the diameter converted to its corresponding circle area) of the flow passage formed in the flame-holding structure usable in the present embodiment ranges from 5 mm to 200 mm or so. If this relative diameter is too large, the heat-transmitting surface making use of radiation or convection will decrease. If the relative diameter is small, the pressure loss increases. Thus, it is not preferred to use relative diameters outside the above range.

Futher, if the relative diameter is too small, the gas flow tends to be in a laminar state. When there is laminar flow, the flame propagation velocity becomes lower as mentioned before in the paragraph (e), thereby undesirably producing an adverse effect. Accordingly, it is preferred to select the relative diameter so that the gas flow may be in the turbulant state.

Incidentally, the preferred relative range may practically be 10 to 50 mm or so, although it may vary significantly depending on the operation conditions. (see, Example 15 including FIG. 37, which will be given herein.)

(g) Provision of plural catalyst beds.

In the present embodiment, the combustion may be effected using a combustor equipped with a plurality of catalyst-packed zones arranged in parallel to one another within the combustor and means capable of controlling independently the fuel concentration in a mixture consisting of a fuel and air which mixture flows into each of the catalyst-packed zones. Downstream the catalyst-packed zones, it may also be feasible to provide means for feeding an auxiliary fuel.

According to the present embodiment, it is possible to burn the mixture using some or all of the plurality of the catalyst beds in accordance with load variations of a turbine. By mixing streams flown out of catalyst beds, to which no fuel has been supplied, with the combustion gas occurred as a result of combustion of the thus-charged fuel, a discharge gas of a lower temperature can be obtained. This permits feeding of a discharge gas having a sufficiently low temperature to the gas turbine, whereby successfully meeting a turbine which is operated under a low load.

Here, as means for controlling the aforementioned fuel concentration, it is useful to adjust the fuel concentration by controlling the amount of the fuel to be additionally fed in accordance with the load of the turbine or the amounts of the fuel and auxiliary fuel. It is preferred to cary out the above-mentioned control while sensing the catalyst temperature, the temperature of the flown-out combustion gas and the like, because such sensing is also effective for the prevention of high-temperature combustion which results in the occurrence of a great deal of $NO_x$. (see, Example 16 including FIGS. 38a to 39, which will be given herein.) Certain preferred embodiments of catalyst beds useful in the practice of this invention will next be described in detail.

(1) First preferred embodiment of catalyst bed:

According to this embodiment, a catalyst bed which is suitable for use in a gas turbine combustor is composed of a heat-resistant carrier which supports a silica-alumina mixture containing a noble metal and the oxide of a rare earth element.

In this embodiment, the active carrier features its material, namely, a silica-alumina mixture. In this mixture, the proportions of silica and alumina may be suitably determined depending on the type of each fuel to be used. Basically speaking, it is however desirable to increase the acidity and acid strength at the surface of the resulting solid carrier. It is desirable that alumina is contained in an amount within the range of 5 to 30%.

The above catalyst bed has been improved in low-temperature activity owing to the inclusion of the noble metal such as palladium and platinum and in high-temperature durability by the inclusion of the oxide of the rare earth metal in the silica-alumina mixture. It is also desirable to compose the catalyst bed by two types of catalyst, namely, a former-stage catalyst and a latter-stage catalyst, whereby imparting such properties as exhibiting activities particularly in different temperature ranges. More specifically, it is preferred to set the usable maximum temperature, for example, at 700° C. for the former-stage catalyst and 900° C. for the latter-stage catalyst and to have the former-stage catalyst and latter-stage catalyst contain 1 to 15 wt. % of cerium and 5 to 30 wt. %, in terms of lanthanum, of lanthanum oxide respectively. If their contents should be lower than the lower limits of their respective ranges, it will be unable to expect desirous effects. On the other hand, any contents in excess of the upper limits of their respective ranges will result in a reduction in the heat resistance of the silica-alumina mixture. As a method for incorporating the above-mentioned oxide of the rare earth element, it is most preferred to have the rare earth element deposit as ions or atoms on the silica-alumina mixture and then to calcine the silica-alumina mixture together with the thus-deposited rare earth element. Since the thus-added rare earth element is present in the form of its oxide after the calcination, it may be contemplated to use the oxide of the rare earth element as the starting rare earth element. However, use of such an oxide cannot achieve desirable effects for the following reasons. Namely, it is essential that the oxide, which is to be formed in the silica-alumina mixture, covers as thin layers the walls of pores to be formed in the silica-alumina mixture. This requirement cannot however be fulfilled so long as the oxide is used as the starting material.

For the reasons mentioned above, it is preferred, subsequent to the calcination of the silica-alumina mixture, to impregnate the thus-calcined silica-alumina body with an aqueous solution of a water-soluble salt of the rare earth element as the starting material and then to calcine the thus-impregnated body at temperature of 500° to 900° C.

As a method for having the carrier bear the noble metal, it is also preferred to form the catalyst bed with two types of catalysts, namely, a former-stage catalyst and a latter-stage catalyst and to control the particle size of the noble metal and the pore size of the silica-alumina carrier within the range of 50 to 200 Å in the former-stage catalyst and within the range of 1000 to 2000 Å in the latter-stage catalyst. By making the particle size of the noble metal substantially equal to the pore size of the silica-alumina carrier and changing the particle size of the noble metal and the pore size of the silica-alumina carrier in the former-stage catalyst, which is at the lower-temperature side, from those in the latter-stage catalyst which is at the higher-temperature side, the catalyst bed has both low-temperature side ignition capacity and high-temperature durability as a combustion catalyst. (see, Example 17 which will be given herein.)

(2) Second preferred embodiment of the catalyst bed:

According to this embodiment, a catalyst bed is composed by causing a heat-resistant carrier to support a noble metal such as palladium, platinum or the like and fine aluminum particles comprised of a perovskite-type double oxide represented by the following formula:

$MAl_2O_3$ wherein M means a rare earth element selected from the group consisting of samarium (Sm), gadolinium (Gd), cerium (Ce), lanthanum (La), praseodymium (Pr) and neodymium (Ne). As the rare earth element, Sm and Gd are particularly preferred. It is preferred that the double oxide is contained in a form coated on fine alumina particles. (see, Example 18 which will be given herein.)

(3) Third preferred embodiment of the catalyst bed:

In this embodiment, a catalyst bed is composed of a heat-resistant carrier and alumina supported on the heat-resistant carrier and containing a noble metal-base catalyst, such as Pd, Pt or the like, which has been subjected to a thermal quenching treatment. It is preferred to have a rare earth metal selected from the group consisting of yttrium (Y), cesium (Cs), lanthanum (La), neodymium (Nd), samarium (Sm) and gadlinium (Gd) contained as an alloy in the above-mentioned noble metal-base catalyst. Among these elements, Sm and Gd are particularly suitable. The suitable ratio of the above rare earth element to the noble metal-base catalyst may be about 3:1. The rare earth metal can be converted to the alloy by carrying out its calcination in air at 600° to 1000° C. for about 3 hours. (see, Example 19 which will be described herein.)

EXAMPLE 4

Figure 12:
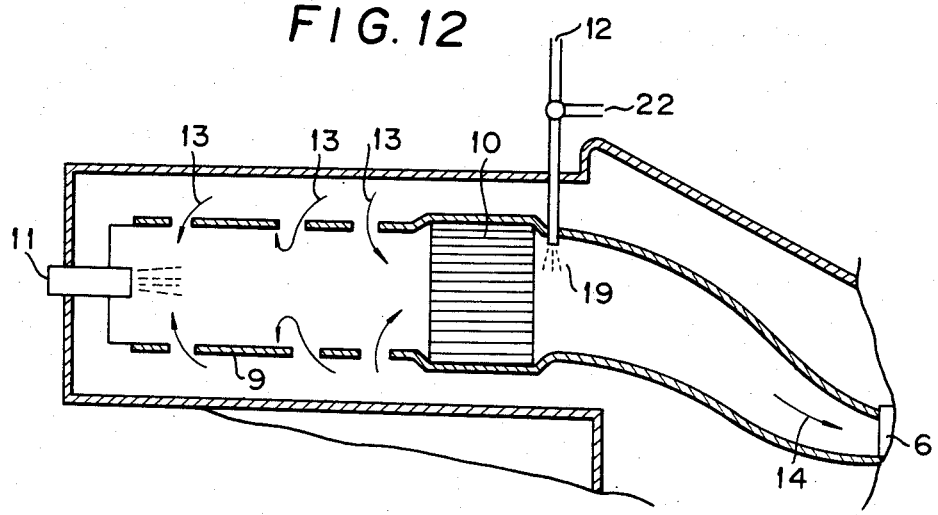

Fabricated was a prototype combustor shown schematically in FIG. 12. A honeycomb-shaped catalyst 10 containing palladium oxide as its principal component was provided within a combustion cylinder 9. The diamter of the catalyst was 30 mm, while its length was 9 cm. A fuel 11 and air 13 were separately injected through their respective feed lines into the combustion cylinder 9, in which they were mixed together. The resulting mixture was then caused to flow into the catalyst 10 at the catalyst inlet gas flow velocity of 26 m/sec. An auxiliary fuel 19 consisting of a fuel 12 and steam 22 was added to a stream flown out of the catalyst 10. A portion of the resultant combustion gas 14 was sampled out to measure its gas composition. By the way, the air 13 and steam 22 were pre-heated respectively to 400° C. and 750° C. The flow rates of the air 13, fuel 11, fuel 12 and steam 22 were 450 Nl/min., 9 Nl/min., 4 Nl/min., and 5 g/min., respectively. Natural gas was employed as the fuels.

For the sake of comparison, the conventional catalytic combustion method was practiced using the same apparatus as that used in the above experiment. However, the diameter and length of the catalyst were respectively 30 mm and 17 cm, the flow rates of the fuel 11 and air 13 were respectively 13 Nl/min. and 450 Nl/min., and the auxiliary fuel 19 was not added. The pre-heating temperature for the air was 500° C.

Figure 13:
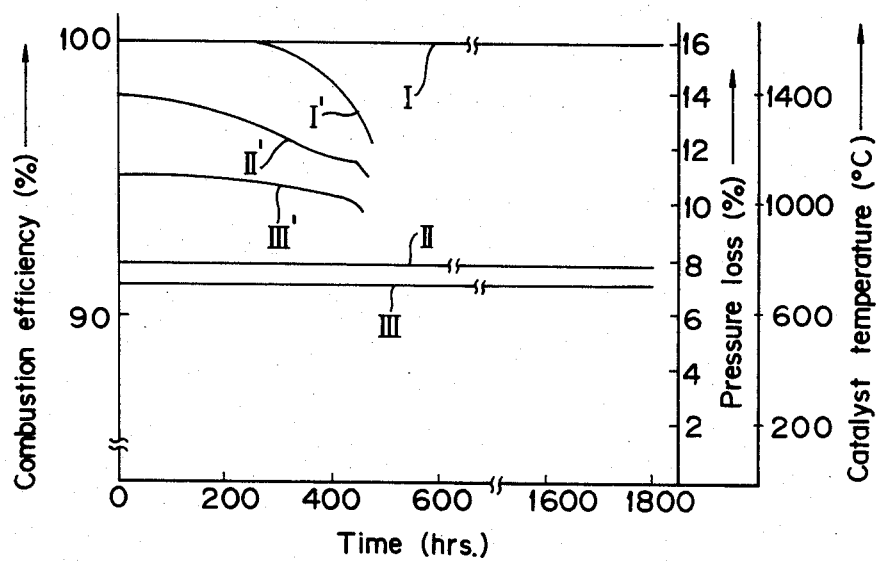

In each of the above experiments, the combustion efficiency, catalyst temperature and pressure loss across the catalyst-packed zone were measured to investigate their variations along the elapse of time. Measurement results are shown in FIG. 13, in which I, I' indicate respectively the combustion efficiencies in the method of this invention and the conventional method, II, II' correspond respectively to the catalyst temperatures in the method of this invention and the conventional method, and III, III' identify respectively the pressure losses in the method of this invention and the conventional method. As apparent from the figure, no appreciable reduction to the combustion efficiency over a long period of time is observed according to the combustion method of this invention. Furthermore, in the case of the combustion method of this invention, the catalyst temperature is kept as a lower temperature compared with that reached in the conventional catalytic combustion method. Hence, the combustion method of this invention can prolong the service life of a catalyst significantly and requires a shorter catalyst length. Therefore, the combustion method of this invention develops a smaller pressure loss, whereby contributing to the performance of the combustor.

By the way, the amount of $NO_x$ produced during combustion in the present Examples of the invention was as little as 1 ppm or even lower. Another experiment was repeated under exactly same conditions except that the steam was not added through the fuel(12)-feeding pipe but the fuel 12 was solely charged through the pipe. The experiment gave 2 to 3 ppm of $NO_x$. From these experiments, it has been confirmed that the addition of steam promotes the stabilization of combustion and enables to decrease the amount of $NO_x$ compared with combustion methods not making use of the steam.

EXAMPLE 5

Using the prototype combustor embodying the present invention and is illustrated in FIG. 5, experiments were conducted to determine the maximum temperature which the combustion gas would be able to have. The fuel 11 and the air 13, said air having been pre-heated to 420° C., were mixed respectively at 92 Nl/min. and 4.8 Nm³/min. in the first step. In the second step, the resultant mixture was fed to the honeycomb-shaped catalyst 10, at the inlet gas flow velocity of 26 m/sec, which contained palladium oxide as its principal component and has a diameter of 100 mm and a length of 9 cm. In the third step, the auxiliary fuel consisting of the fuel and steam was added at a progressively increasing flow rate through the fuel feed pipes 21 which extended through the catalyst, whereby to raise the temperature of the combustion gas. The amount of the steam added at this stage was varied within the range of 5 to 50 g/min. Natural gas was used as the fuels.

Figure 1:
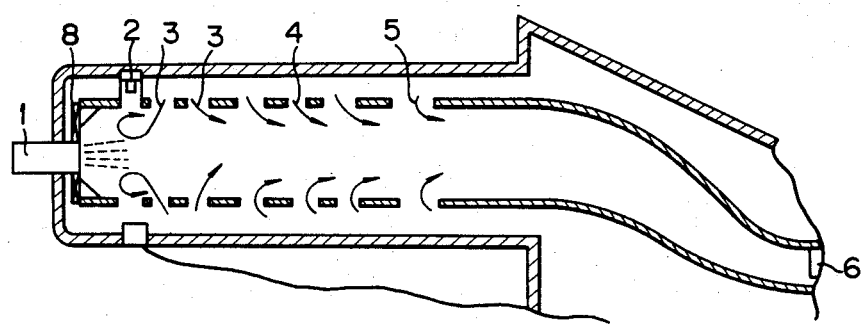
FIGS. 1, 2 and 10 are schematical sectional illustrations of conventional gas turbine combustors.
Figure 2:
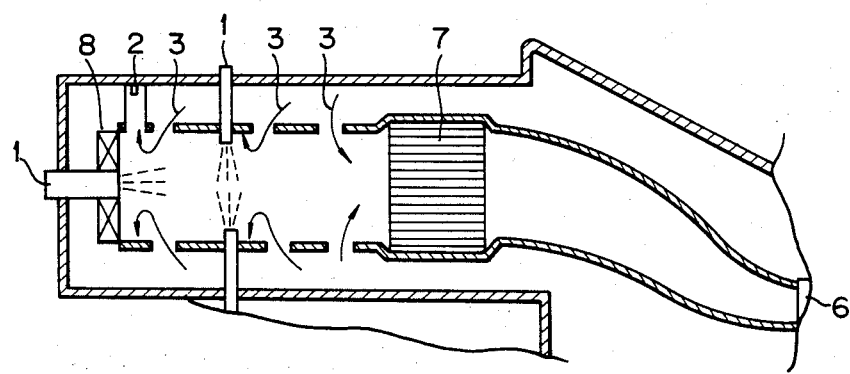

As a comparative example, further experiments were carried out using the prototype combustor of the prior art catalytic combustion method shown in FIG. 2. A honeycomb-shaped catalyst containing palladium oxide as its principal component and having a diameter of 100 mm and a length of 9 cm was packed in the former-stage side of the catalyst-packed zone 7, at which side the catalyst was first brought into contact with the mixture. In the latter-stage side of the catalyst-packed zone 7 which latter-stage side followed the former-stage side, another honeycomb-shaped catalyst containing platinum as its principal component and having a diameter of 100 mm and a length of 9 cm was packed. Natural gas was fed as the fuel 1. At the same time, the air 3 which had been pre-heated to 500° C. was supplied at 4.8 Nm³/min. Here, the temperature of the combustor gas was raised by adding the fuel 1 in a progressively increasing amount. In the above experiments, it was possible to raise the temperature of the combustion gas up to 1450° C. at the maximum in the present invention. However, in the case of the prior art catalytic combustion method, the catalyst was fused and broken when the combustion gas reached 1300° C. because the gas-phase combustion took place also in the catalyst bed.

EXAMPLE 6

Fabricated was a prototype combustor similar to that illustrated in FIG. 14. The prototype combustor was equipped with a honeycomb-shaped catalyst having a diameter of 100 mm and a length of 10 cm and containing palladium as its principal component. This combustor was provided at a location downstream the catalyst with a portion 15 in which the stream of the compound gas expanded. This portion 15 serves as a back-flow zone or stagnation zone for the stream of the compound gas. An ignitor stick 17 is provided at the portion 15, whereby making up an ignition source. The catalyst was heated at 800° C. for 5000 hours in an electric furnace prior to its use. The flow rate of the fuel 11 was 100 Nl/min. The fuel and steam, the latter having been pre-heated to 750° C., were fed respectively at 40 Nl/min. and 40 g/min. to form the auxiliary fuel 19. On the other hand, the air 13 which had been pre-heated to 350° C. was charged at a flow rate of 4.8 m³/min. The catalyst inlet gas flow velocity was 23 m/sec. The auxiliary fuel 19 was added in portions at three locations. Natural gas was used as the fuels. After feeding the fuels and air, sparks were produced from the ignitor stick 17 so as to burn up the resultant compound gas completely. Then, the ignitor stick 17 was pulled out. Upon an elapsed time of 1 hour, the combustion efficiency reached 99.9% or even higher and the amount of produced $NO_x$ was kept as little as 1 ppm or even lower. On the other hand, the maximum temperature of the catalyst did not exceed 780° at any points along the direction of the stream. This maximum temperature is lower than the temperature at which the catalyst was forcedly heated for 5000 hours in the electric furnace. Therefore, it is estimated that an operation of 5000 hours or longer may be feasible upon actually effecting combustion.

EXAMPLE 7

Combustion was effected using such a prototype combustor as shown in FIG. 19a, natural gas as a fuel, and as a catalyst bed, a honeycomb-shaped catalyst bed having a diameter of 100 mm and a length of 100 mm and containing palladium oxide as its principal component. The abovedescribed mixed gas consisted of natural gas and burning air was heated to 450° C. and was then charged into the catalyst bed at a flow rate of 20 m/sec to 50 m/sec when expressed at 500° C. Non-streamline bodies eachy having cylindrical shape of 30 mm across were provided at a location 40 mm downstream from the catalyst bed. The sampling point of the combustor gas was 250 mm downstream the catalyst bed. The adiabatic flame temperature of the mixed gas was 1200° C.

To observe differences between combustion making use of the non-streamline body 8 and combustion making no use of the same, experiments were conducted at varied gas flow velocities as shown in Table 1 below and in such a manner that the combustion making no use of the non-streamline body was controlled so as to result in the combustion efficiency as also shown in Table 1. Results of the experiments are summarized in Table 1. The $NO_x$ level was below 3 ppm during the combustion in each of the above experiments.

TABLE 1

| Flow velocity of mixed gas (m/sec.) | Without non-streamline body Combustion efficiency (%) | With non-streamline body Combustion efficiency (%) |
|---|---|---|
| 20 | 95.1 | >99.9 |
| 30 | Extinguished | >99.9 |
| 40 | Extinguished | >99.9 |
| 50 | Extinguished | 95.3 |

In the catalyst combustor employing the non-streamline body 8, the fire was not extinguished even at a high flow velocity and very high combustion efficiency was exhibited stably, while extinction took place as the flow velocity of the mixed gas increased in the cases where no non-streamline body was provided.

EXAMPLE 8

Combustion was carried out using such a prototype combustor as shown in FIG. 19a, methane as a fuel, and as a catalyst bed, a honeycomb-shaped, palladium oxidel-base catalyst bed similar to that employed in Example 7. The diameter and length of the catalyst bed were 100 mm and 100 mm respectively. The composition of the mixed gas which flew into the catalyst bed 7 was controlled to keep the molar ratio of the fuel to the burning air at 1.8%. The temperature of the mixed gas was raised to 550° C. in an electric furnace. The gas flow velocity at the catalyst inlet was 30 m/sec. Then, the fuel was solely fed through the auxiliary fuel injector 9 in such an amount that the molar ratio of the sum of the supplied fuels to the burning air became 2.6%. Upon initiation of the combustion, the non-steamline body 8 was used as a heater to induce combustion in the zone downstream the catalyst bed. After the combustion had reached a steady state, the temperature of the catalyst bed was 810° C. at the rear end thereof, the combustion efficiency was 99% or higher, and the concentration of produced $NO_x$ was 2 ppm or less.

In the catalyst combustor according to the present invention, the temperature of the catalyst bed 7 was as low as about 800° C., which was below the withstandable maximum temperature of the catalyst.

EXAMPLE 9

Figure 21:
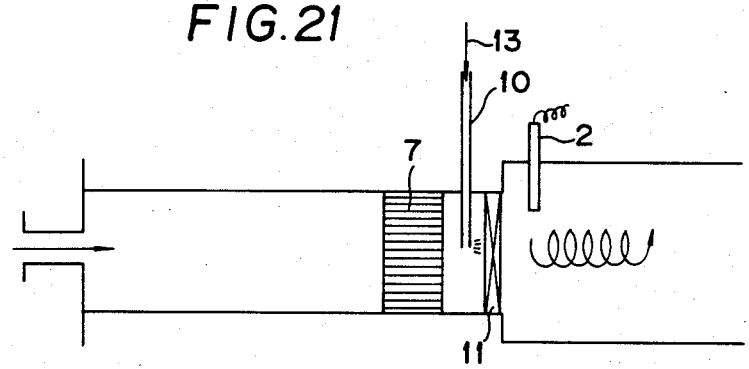

A prototype combustor having an internal diameter of 100 mm and suitable for use in substantiating the effects of this invention is illustrated schematically in FIG. 21. A mixture of a fuel (natural gas) and air, which mixture had been heated to 450° C., was fed from the upstream side of the combustor to a catalyst-packed zone 7. Through an auxiliary fuel nozzle 10 provided at a location downstream the catalyst-packed zone 7, a fuel 13 (natural gas) was additionally fed. The resultant mixed gas was caused to pass through a swirler 11 which was used as mixing means, thereby causing the mixed gas to burn. Its ignition was effected using a spark plug 2. Catalyst used was comprised principally of palladium oxide. The flow velocity of the mixture was controlled at 20 m/sec. at a point right before the catalyst-packed zone 7. The auxiliary fuel nozzle 10 had an internal diameter of 5 mm. The auxiliary fuel nozzle 10 had at its tip an opening of 5 mm across. At the inlet of the catalystpacked zone 7, the adiabatic flame temperature of the mixture was 1050° C.

Experiment was conducted while changing the flow rate of the fuel supplied through the auxiliary fuel nozzle 10 so as to control the adiabatic flame temperature of the combustion gas finally discharged to a turbine. The experiment was conducted to measure the combustion efficiency and $NO_x$ concentration under two situations, one with the swirler 11 and the other without the swirler 11. The sampling of the combustion gas was effected at a point 30 cm downstream the catalyst-packed zone 7.

Figure 22:
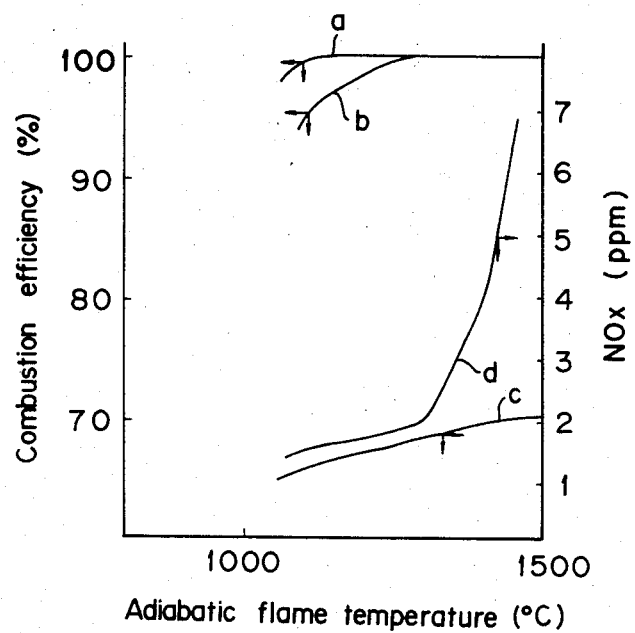
Figure 23:
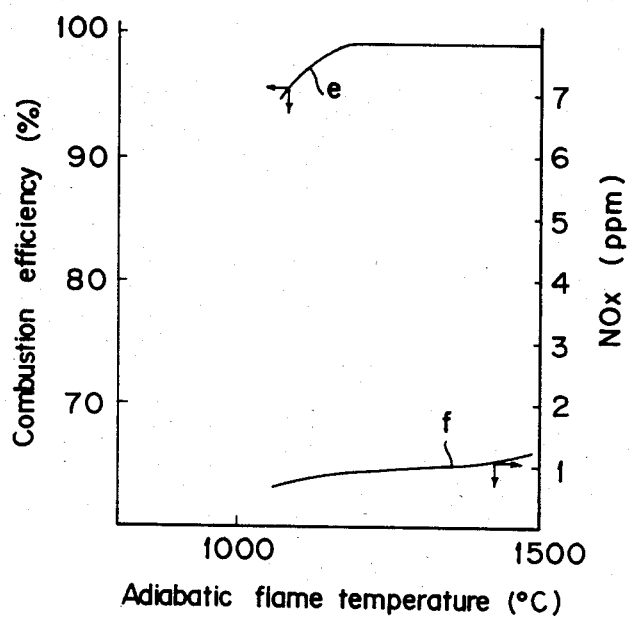

Results of the experiment are shown as a characteristic diagram in FIG. 22, in which adiabatic flame temperature after incorporation of the additional fuel are plotted along the axis of abscissas. The curve a indicates the combustion efficiency in the case where the swirler was provided (hereinafter "former case") while the curve b represents the combustion efficiency in the case where no swirler was used (hereinafter "latter case") $NO_x$ concentrations in the former case and the latter case are respectively shown by the curves c and d.

As shown in the figure, the $NO_x$ concentration in the latter case increases abruptly as the adiabatic flame temperature goes up. As reasons for this behavior, it may be contemplated that the added auxiliary fuel burnt before it was fully mixed with the stream from the catalyst-packed zone 7 and localized high temperature were thus developed, leading to the abrupt jump in the concentration of $NO_x$. The $NO_x$ concentration in the former case is lower compared with that available from the use of a combustor which is not equipped with the swirler 11. Furthermore, the combustion efficiency has been improved in the former case over the latter case. This improved combustion efficiency may be attributed to the occurrence of a swirl owing to the provision of the swirler.

EXAMPLE 10

Figure 20B:
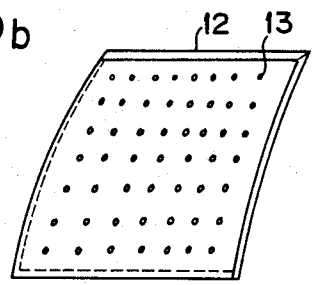

An experiment similar to that conducted in Example 9 was carried out using the same apparatus as that employed in Example 9 except that a device having such a structure as shown in FIGS. 20a and 20b and capable of serving as both swirler and fuel nozzle was used in place of the auxiliary fuel nozzle 10 and swirler 11 in Example 9. Results are shown as a characteristic diagram in FIG. 23. As to the combustion efficiency (curve e) and $NO_x$ concentration (curve f), this Example gave good results similar to Example 9.

EXAMPLE 11

Figure 26:
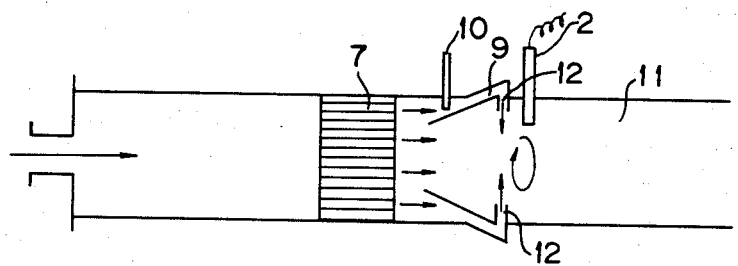

A prototype combustor suitable for use in substantiating the effects of this invention and having an internal diameter of 100 mm is illustrated schematically in FIG. 26. A mixture of a fuel (natural gas) and air, which mixture had been heated to 450° C., was fed from the upstream side of the combustor to a catalyst-packed zone 7. A stream which had passed through the catalyst-packed zone 7 was guided to a conical swirl-producing zone 9 equipped with a pair of annular nozzles 12. At the same time, a fuel was additionally fed through an auxiliary fuel nozzle 10. The stream and fuel were combined together into a mixed gas, which was then supplied through the nozzles 12 into a combustion chamber 11 where it was caused to burn. Its ignition was effected by a spark plug 2. The flow velocity of the mixture was 20 m/sec. at a point immediately before the catalyst-packed zone 7. The auxiliary fuel nozzle 10 had an internal diameter of 5 mm and defined at its tip an opening having a diameter of 5 mm. At a location closest to the catalyst-packed zone 7, the conical swirl-producing zone 9 had a diameter of 70 mm while the nozzles 12 had a diameter of 10 mm. The adiabatic flame temperature of the fuel/air mixture was controlled at 950° C. at the inlet of the catalyst-packed zone 7.

An experiment was carried out while changing the flow rate of the fuel from the auxiliary fuel nozzle 10 to adjust the adiabatic flame temperature of the combustion gas to be eventually discharged to a turbine. In the experiment, the combustion efficiency and $NO_x$ concentration were measured under two situations, one with the swirl-producing zone 9 and the other without the swirl-producing zone 9. The sampling of the combustion gas was effected at a point 300 mm downstream the catalyst-packed zone.

Figure 27:
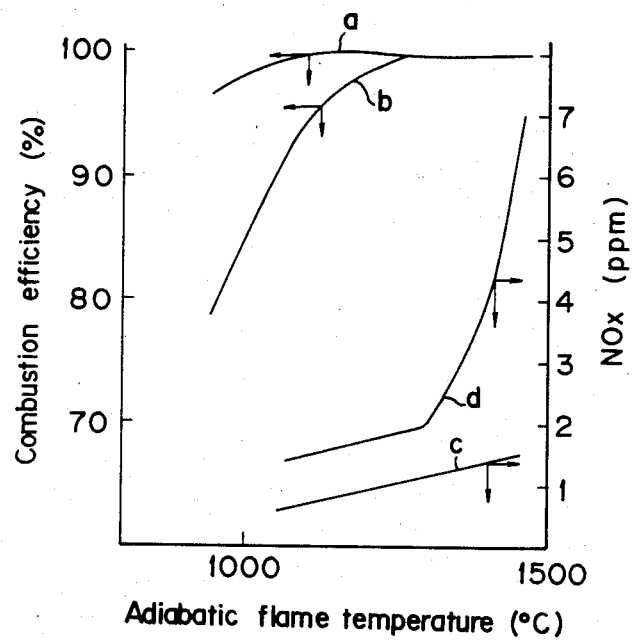

Results of the above experiment are shown in the characteristic diagram of FIG. 27, in which adiabatic flame temperatures after incorporation of the additional fuel are plotted along the axis of abscissas. The curve a indicates the combustion efficiency in the case where the swirl-producing zone was provided (hereinafter "former case") while the curve b represents the combustion efficiency in the case where no swirl-producing zone was provided (hereinafter "latter case"). $NO_x$ concentrations in the former case and the latter case are respectively shown by the curves c and d.

From the figure, it is understood that the combustion efficiency in the former case is higher compared with that available from the use of the combustor of the latter case. Since the effects of the former case become more remarkable particularly as the adiabatic temperature decreases, it is appreciated that the combustible range has been expanded in the former case. It is also understood that the former case is also superior in $NO_x$ to the latter case. In the figure, the $NO_x$ concentration in the latter case increases abruptly as the adiabatic flame temperature goes up. As reasons for this behavior, it may be contemplated that the added auxiliary fuel burnt before it was fully mixed with the stream from the catalyst-packed zone 7 and localized high temperature were thus developed, leading to the abrupt increase of the concentration of $NO_x$.

EXAMPLE 12

Figure 29:
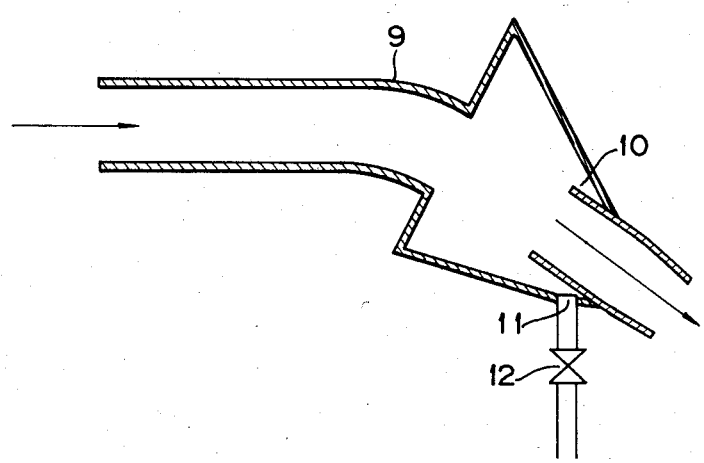

In this Example, a device the outline of which is illustrated in FIG. 29 was used in order to investigate the efficiency of dust collection only. The illustrated device is equivalent to a portion extending from a point downstream the catalyst-packed zone to the turbine nozzle in a gas turbine combustor. The flow passage is 100 mm in diameter, which terminates in a bend 9 corresponding to an arc having a radius of 3 m and a curvature of 30°. At a location 200 mm downstream from the entrance of the bend, a double-walled portion 10 is formed. The diameter of the outer tube is 250 mm at a point 200 mm downstream from the entrance of the bend and 100 mm, which is the same as the diameter of the inner tube, at a point 700 mm downstream from the entrance of the bend. Thus, the outer tube is rearwardly squeezed. The passage between the outer tube and the inner tube is kept open over a first 200-mm section of the double-walled portion 10. Through the lower wall of the outer tube, an opening 11 is formed to take out collected matter therethrough. The collected matter can be taken out by opening a valve 12.

In the present example, ceramics was used as powder to be collected. A carrier of a honeycomb structure was ground and the classified through sieves into three portions of different particle sizes, namely, over 16 mesh, 16 mesh to 6 mesh, and below 6 mesh (pan).

Air of about 20° C. was caused to flow at a flow velocity of 40 m/sec. through the flow passage and classified ceramic powder of a known weight was charged from the upstream. Then, the weight of the ceramic powder collected in the double-walled tube was measured to determine the effficiency of collection. The measurement was repeated three times on each of the differnr particle sizes. Measurement results were averaged and are shown in Table 2.

TABLE 2

| Particle size (mesh) | Efficiency of collection (%) |
|---|---|
| over 16 | 76 |
| 16 to 6 | 93 |
| below 6 (pan) | 98 |

From the above results, it has been found that powder of a particle size coarser than 16 mesh can be collected with an efficiency of 90% or higher at the flow velocity of 40 m/sec. Although the efficiency of collection decreased as the particle size became smaller, no deleterious effect was given to the turbine because such uncollected particles had small sizes. Furthermore, an analysis on the energy of their collision showed that it was not so large as damaging the turbine.

EXAMPLE 13

Figure 32:
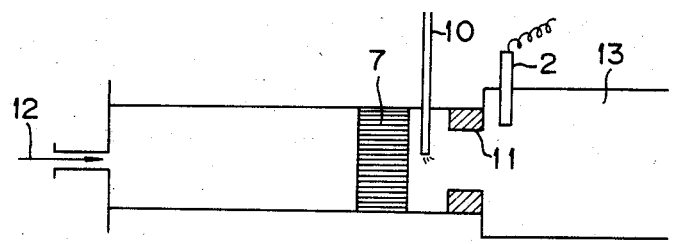

A prototype combustor having an internal diameter of 100 mm and suitable for use in substantiating the effects of this embodiment of the present invention is illustrated in FIG. 32. A mixture 12 of a fuel (natural gas) and air, which mixture had been heated to 450° C., was fed from an upstream zone of the combustor to a catalyst-packed zone 7. A fuel (natural gas) was additionally fed through a fuel nozzle (fuel adding zone) 10 provided at a point downstream the catalytic combustion zone. The resultant mixed gas was caused to pass through a back-fire preventive zone 11 having a smaller cross-sectional area, namely, having a diameter of 60 mm and a length of 100 mm. The mixed gas was then caused to burn in a gas-phase combustion zone 13. Its ignition was effected by means of a spark plug 2. The flow velocity of the mixture was 20 m/sec. at a point right before the catalyst-packed zone 7. The internal diameter of the fuel nozzle 10 was 5 mm. The fuel nozzle 10 had at its tip an opening having a diameter of 5 mm. The adiabatic flame temperature of the mixture was set at 1050° C. at the inlet of the catalyst-packed zone 7.

Experiment was carried out while changing the flow rate of the fuel through the fuel nozzle 10 to adjust the final adiabatic flame temperature. In the experiment, the combustion efficiency and $No_x$ concentration were measured under two situations, one with the back-fire preventive zone 11 and the other without the back-fire preventive zone 11. The sampling of the combustion gas was carried out at a point 30 cm downstream the catalyst-packed zone 7.

Figure 33:
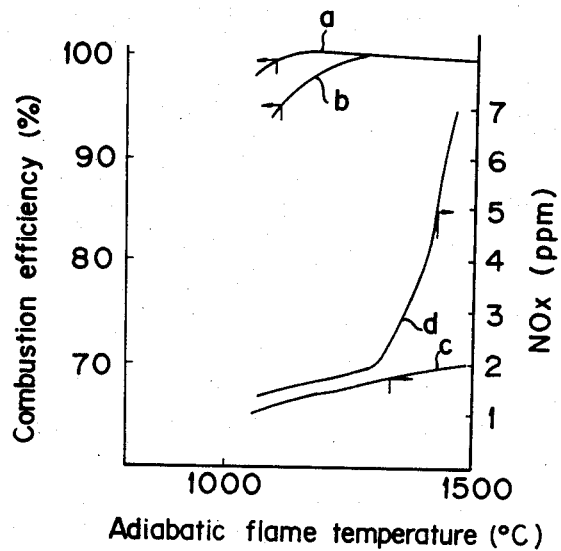
Figure 34:
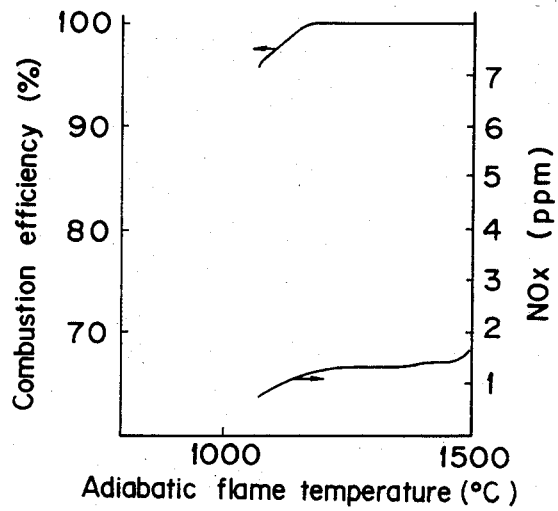

Results of the experiment are diagrammatically shown in FIG. 33, in which adiabatic flame temperature after the incorporation of the additional fuel are plotted along the axis of abscissas. The curve a indicates the combustion efficiency in the case where the back-fire preventive zone was provided (hereinafter "former case") while the curve b represents the combustion efficiency in the case where the back-fire preventive zone was not provided (hereinafter "latter case"). $NO_x$ concentrations in the former case and the latter case are respectively shown by the curves c and d.

From the figure, it is understood that $NO_x$ concentration in the latter case increases abruptly as the adiabatic flame temperature goes up. As reasons for this behavior, it may be contemplated that the added auxiliary fuel burnt before it was fully mixed with the stream from the catalyst-packed zone 7 and localized high temperatures were thus developed, leading to the abrupt increase of the concentration of $No_x$. The $NO_x$ concentration in the former case is lower compared with that in the latter case and the combustion efficiency was improved in the former case over the latter case. This improved combustion efficiency may be attributed presumably to the development of a reversed-flow section in the stream owing to the enlargement in diameter at a location downstream the zone indicated by the back-fire preventive zone 11 and hence the occurrence of flame-maintaining effects.

EXAMPLE 14

An experiment similar to that conducted in Example 13 was carried out, using the same apparatus as that employed in Example 13 except that a honeycomb structure defining cells of 1 mm in diameter and having a length of 10 mm was provided in place of the back-fire preventive zone 11 in Example 13. Results are diagrammatically shown in FIG. 34. Good results were also obtained with respect to the $NO_x$ concentration in the present Example.

EXAMPLE 15

Figure 37:
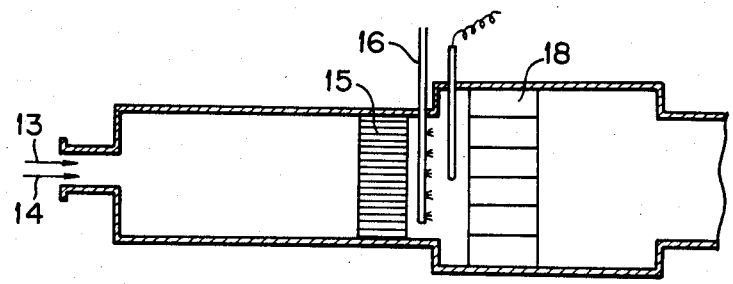

An experimental apparatus is schematically illustrated in FIG. 37. A catalyst bed 15 was formed by packing a honeycomb-shaped palladium-base catalyst over a length of 10 cm. By the way, the diameter of the catalyst was 200 mm. A mixture obtained by mixing air 13 and a fuel 14 and heated to a temperature of 400° C. was caused to pass through the catalyst bed 15. As a flame-holding structure 18 defining a plurality of flow passages which were parallel to the stream of the mixed gas, there was employed a ceramic ($Al_2O_3$)-made structure having a square cross-section, defining flow passages each of 50 mm long and having inter-passage walls of 8 mm thick. The apparatus has a diameter of 300 mm at the location where the ceramic-made structure is provided.

The flow rate of the air 13 was adjusted to control the flow velocity of the mixture at 35 m/sec. at the inlet of the catalyst bed 15. Natural gas was employed as fuels 14, 16. The concentration of the natural gas in the mixture was set at such a level that the theoretical adiabatic flame temperature would reach 1000° C. at the inlet of the catalyst bed. The fuel 16 was increased in amount and after the ignition, this amount was decreased. In the course of this reduction in the amount of the fuel 16, the theoretical adiabatic flame temperatures as the overall apparatus when the combustion efficiency became lower than 97% were compared. Results are shown in Table 3. By the way, the catalyst was heated at 1000° C. for 4000 hours to accelerate its deterioration forcedly prior to its use.

TABLE 3

| | Example 15 |
|---|---|
| Theoretical adiabatic flame temperature when the combustion efficiency became lower than 97% | 1180° C. |

EXAMPLE 16

Figure 38A:
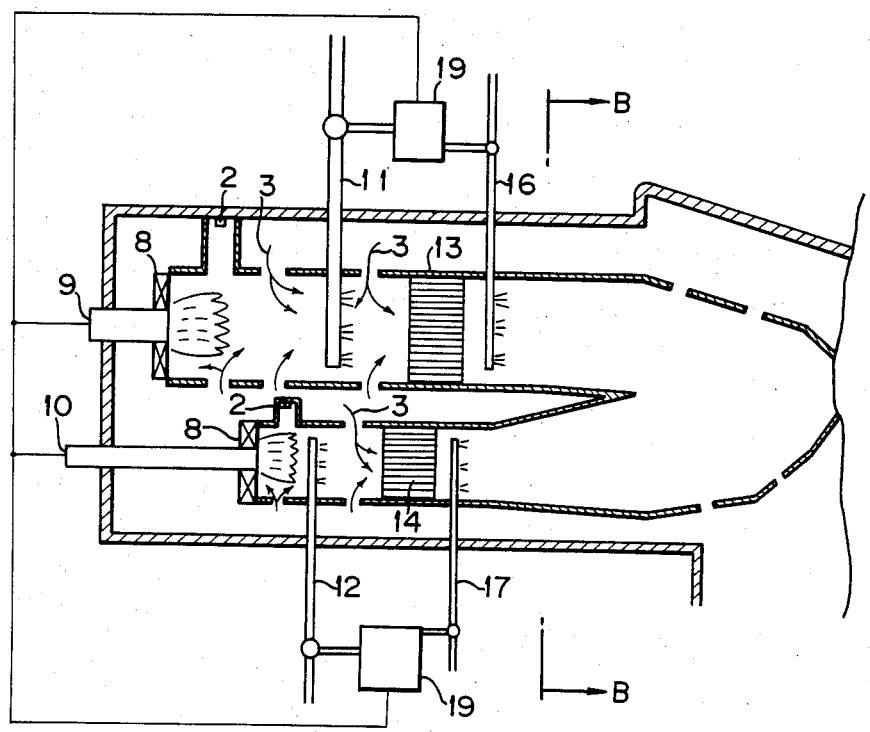
Figure 38B:
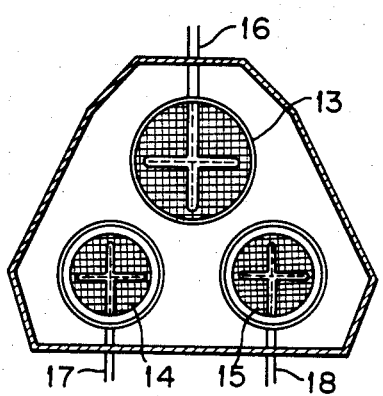

One example of gas turbine combustor according to this invention is shown in FIG. 38a. In the present Example, preliminary fuels for pre-combustion were fed through fuel nozzles 9, 10. These preliminary fuels were ignited by a spark plug 2 to cause them to burn in advance as a heating source. Thereafter, fuels were charged through fuel nozzles 11, 12. The resulting mixtures were thus heated by pre-combustion to a temperature at which catalysts in catalyst-packed zones 13, 14 were able to act. This pre-combustion may be omitted when a coal gas or the like capable of initiating its combustion even at a low temperature in the presence of a catalyst. The feeding of the preliminary fuels and the fuels is controlled by a concentration controller 19. In this Example, three catalyst-packed zones having such structures as shown in cross-section in FIG. 38b taken along the line B—B in FIG. 38a are provided, and fuel nozzles 16, 17, 18 are also provided at a portion downstream the catalyst bed each, to which combustion zones thus formed the fuels are supplied. Thus in this Example, the combustion zone, in which the mixture was burnt, is divided into three sections.

Figure 39:
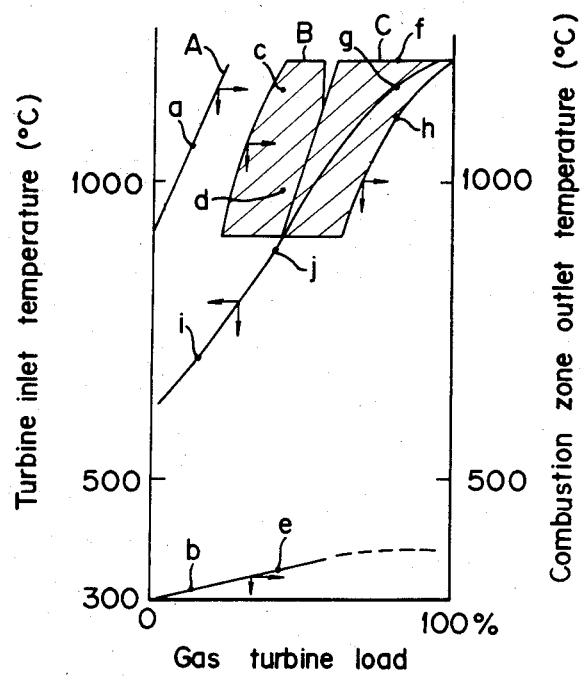

FIG. 39 diagrammatically illustrates the relationship between the turbine inlet temperature and each combustion zone outlet temperature and the gas turbine load in this Example. In this Example, the maximum output ratio of the catalysts packed respectively in the catalyst-packing sections 13, 14 15 was set at 2:1:1 respectively.

In FIG. 39, the curve A indicates a range of temperatures in a conbustible range available only by combustion in the catalyst-packed zone 13 and its down stream area. Area B represents a range of temperatures in a combustible range available when the catalyst-packed zone 13 is combined with either one of the catalyst-packed zones 14, 15. Area C indicates a range of temperatures in a combustible range available when the three catalyst-packed zones 13, 14 15 are combined together For example, the point a in FIG. 39 is a temperature under conditions set at the outlet of the combustion zone having the catalyst-packed zone 13. The point b is, similarly, a temperature at the outlet of the combustion zone having the catalyst-packed zones 14, 15. Here, at this point b, no fuel had been fed to the catalyst-packed zones 14, 15. Thus, the pre-combustion had solely been induced there. Representing now the temperatures at the outlets of the combustion zones by the point a, the point b and the point b, the turbine inlet temperature at which the combustion gases flown respectively out of the combustion zones are combined together and are fed to the turbine is the point i which is equivalent to a gas turbine load of 14%.

Supposing similarly that the temperatures of the combustion zones are respectively at the point c, d and e, the gas turbine inlet temperature comes to the point j which corresponds to a load of 42%. In this case, the combustion gas produced solely from the pre-combustion has been fed to the catalyst-packed zone of the combustion zone represented by the point e. Thus, the fuel is fed to only two of the three combustion zones, namely, the combustion zones corresponding to the points c and d. The catalytic combustions is thus under way in the two combustion zones only.

Representing the combustion outlet temperatures by the point f, the point g and the point h respectively in the same manner, the gas turbine inlet temperature is the point g which corresponds to a load of 80%. Here, the fuel is fed to all the three combustion zones and is subjected to catalytic combustion there.

As mentioned above, the present embodiment can fully cope with load variations of a turbine. The shapes and sizes of the range A and the areas B and C may be determined in various ways, depending on the type and shape of each catalyst to be used, the number of combustion zones, the type of each fuel to be employed, the flow velocity, etc.

EXAMPLE 17

After blowing $CO_2$ for 1 minutes and at 24° C. into a water glass solution containing 4.8% of $SiO_2$ to react $CO_2$ with $SiO_2$, the reaction mixture was stirred to control the pore diameter of a silica-alumina mixture to be formed, thereby preparing a hydrogel slurry of pH 9.6. After adding an aluminum sulfate solution in an amount of 7.3% in terms of alumina to the slurry, the resultant mixture was aged for 30 minutes. Then, its pH was adjusted to 8.0 with ammonia solution. The mixture was thereafter filtered, washed and dried, thereby obtaining a silica-alumina gel.

One hundred grams of the above-prepared silica-alumina gel were comminuted and classified to the particles of 0.3 micrometers. The resultant alumina gel particles were dispersed in 100 cc of butanol which contained 5 g of dioctyl phthalate and 10 g of polyvinyl butyrate. A honeycomb-shaped cordierite carrier having 31 cells/cm² was caused to carry the thus-prepared alumina gel dispersion. It was then calcined at 850° C. for 3 hours to obtain a honeycomb-shaped catalyst carrier ($SiO_2$—$Al_2O_3$: 20%; pore diameter: 100 Å) useful in the practice of this invention.

Then, there was prepared 200 cc of an aqueous solution which contained 2 g of palladium chloride ($PdCl_2$) and 4 g of cerium nitrate [$Ce(NO_3)_3.6H_2O$], in which the honeycomb-shaped catalyst carrier ($SiO_2$—$Al_2O_3$) was dipped for more than 1 hour. Thereafter, the honeycomb-shaped catalyst carrier was pulled out of the aqueous solution and after drying it at 200° C., was calcined at 700° C. for 3 hours in an air atmosphere and then at 400° C. for 1 hour in a hydrogen atmosphere to obtain Catalyst A suitable for use in a gas turbine combustor according to this invention.

Catalyst B was also obtained following the above procedures except that the stirring time of the $CO_2$-blown water glass solution for the control of the pore size was changed to 200 seconds and the catalytst raw materials supported on the honeycomb-shaped carrier were changed to 5 g of platinic chloride ($H_2PtCl_6.6H_2O$) and 4 g of lanthanum nitrate [$La(NO_3)_3.6H_2O$].

These catalytsts are as shown in Table 4.

TABLE 4

| Catalyst | Stirring time of silica sol for the control of pore diameter (sec.) | Nobel metal | Rare earch element in its oxide |
|---|---|---|---|
| Example | | | |
| A | 80 | Pd | Ce |
| B | 200 | Pt | La |

Using a prototype model of a gas turbine combustor according to this invention as shown, the combustion characteristics of Catalysts A and B of the above-mentioned Examples and Catalysts a to F of the above-described Comparative Examples were evaluated by combining them as shown in Table 5. The following combustion conditions were employed.

| | |
|---|---|
| Gas flow velocity: | 30 m/sec |
| Methane concentration in the mixture: | 3% |
| Auxiliary fuel: | 2% |
| Length of catalyst: | 90 mm |
| Diameter of catalyst: | 30 mm |

The above auxiliary fuel was added so that concentration of the fuel at the area downstream the catalyst bed, including the fuel having been burnt, may be 5%. The ignition temperature and combustion efficiency of methane upon an elapsed time of 100 hours of the combustion time were measured. Results are shown in Table 5.

From Table 5, it is appreciated that the catalytsts of this invention were able to lower significantly the ignition temperature of methane, which may be used as an index for the low-temperature ignition capacity, compared with those of the Comparative Examples and were also far superior in combustion efficiency which may serve as an index for the high-temperature durability.

TABLE 5

| Combination of catalyst | | Combustion characteristics | |
|---|---|---|---|
| Former-stage catalyst | Latter-stage catalyst | Ignition temp. (°C.) | Combustion efficiency (%) |
| A | B | 300 | 100 |

It is hence possible to enhance the effect of the combustion method according to this invention, by using a catalytst capable of exhibiting excellent low-temperature ignition capacity and high-temperature durability as mentioned above.

EXAMPLE 18

An alumina-base coating formulation of the following composition was prepared.

| | |
|---|---|
| Activated alumina power | 100 parts |
| Alumina sol | 60 parts |
| Aluminum nitrate | 5 parts |
| Water | 45 parts |

The above materials were mixed at room temperature for 2 hours in a ball mill. A cordierite honeycomb-shaped carrier (with 31 cells per square centimeter), which had in advance been caused to absorb water, was then dipped in the above-prepared composition. Thereafter, the carrier was pulled out of the composition, and any excess portion of the coating composition was blown off. After drying the thus-coated carrier, it was calcined at 650° C. for 3 hours. Then, the resultant cordierite carrier with an activated alumina layer formed thereon was caused to adsorb water sufficiently. It was then immersed for one hour in a samarium nitrate solution to have the activated alumina layer adsorb samarium. The thus-immersed carrier was then dried and calcined at 1100° C. for 3 hours, thereby forming a coating layer of a double oxide of the perovskite type. The cordierite carrier having the activated alumina layer formed thereon and bearing the double oxide coated thereon was thereafter caused to absorb water sufficiently. Then, it was immersed for 1 hour in a solution of palladium chloride to have the alumina layer adsorb palladium. The thus-obtained carrier was dried and calcined to convert it into a catalyst. The amount of the supported palladium was 6 g/liter. This catalyst will be called Catalyst A.

Five types of catalysts (Catalyst B to Catalyst F) were obtained in the same manner as above except that the type of the rare earth metal, which was converted into the double oxide of the perovskite type, was changed in various ways. These catalytsts are summarized in Table 6.

Using a prototype model of a gas turbine combustor according to this invention as shown in FIG. 7, the combustion characteristics of Catalysts A to F were evaluated. The following combustion conditions were employed.

| | |
|---|---|
| Gas flow velocity: | 30 m/sec. |
| Methane concentration in the mixture: | 3% |
| Auxiliary fuel: | 2% |
| Length of catalyst: | 90 mm |

The abvoe auxiliary fuel was added so that concentration of the fuel at the area downstream the catalyst bed, including the fuel having been burnt, may be 5%.

The ignition temperature and combustion efficiency of methane upon an elapsed time of 100 hours of the combustion time were measured. Results are shown in Table 6 together.

From Table 6, it is appreciated that the Catalysts A to F were able to lower significantly the ignition temperature of methane, which may be used as an index for the low-temperature ignition capacity, and thus to ignite fuels at lower temperatures, and were also superior in combustion efficiency which may serve as an index for the high-temperature durability. Similar results were also demonstrated when Pt was employed as the noble metal.

TABLE 6

| Catalyst | Metallic additive | Combustion characteristics | |
|---|---|---|---|
| | | Ignition temp. (°C.) | Combustion efficiency (%) |
| A | Sm | 300 | 100 |
| B | Gd | 300 | 100 |
| C | Ce | 305 | 96.8 |
| D | La | 320 | 98.0 |
| E | Pr | 325 | 97.0 |
| F | Nd | 320 | 97.8 |

EXAMPLE 19

An alumina sol having 80% of solid portions was mixed and ground at room temperature for 2 hours in a ball mill. It was then caused to run down over a honeycomb-shaped cordierite carrier (31 cells/m$^2$; carrier volume: one liter) so that the carrier was coated with the alumina sol. Thereafter, it was dried at room temperature for about 1 day, followed by its calcination at 650° C. for 10 hours.

After immersing the alumina-coated honeycomb-shaped carrier in 0.5 liter of an aqueous solution containing 10 g of palladium chloride and 25 g of samarium nitrate, the resultant carrier was dried at 200° C. for 1 hour. Thereafter, it was calcined at 700° C. for 3 hours. Then, it was subjected to activation treatment at 400° C. for 1 hour in a hydrogen atmosphere. It was then pulled out of the treatment atmosphere and immersed in water to quench same, thereby obtaining Catalyst A suitable for use in a gas turbine combustor according to this invention. In a manner similar as above, four types of catalysts B to E were prepared by changing the types of the noble metal and rare earth metal as shown in Table 7.

Using a prototype model of a gas turbine combustor of the catalytic system, the combustion characteristics of Catalysts A to E were evaluated. The following combustion conditions were employed

| Gas flow velocity: | 30 m/sec. |
|---|---|
| Methane concentration in the mixture: | 3% |
| Auxiliary fuel: | 2% |
| Length of catalyst: | 90 mm |

The above auxiliary fuel was added so that concentration of the fuel at the area downstream the catalyst bed, including the fuel having been burnt, may be 5%. The ignition temperature and combustion efficiency of methane upon an elapsed time of 100 hours of the combustion time were measured. Results are shown in Table 7.

From Table 7, it is appreciated that the Catalysts A to E were able to lower significantly the ignition temperature of methane, which may be used as an index for the low-temperature ignition capacity, and hence to ignite fuels at lower temperatures, and has high activity levels. They are also superior in combustion efficiency which may serve as an index for the high-temperature durability. It is thus understood that Catalysts A to E have longer service life.

It is hence possible to enhance the effect of the combustion method according to this invention, by using a catalytst capable of exhibiting excellent low-temperature ignition capacity and high-temperature durability as mentioned above.

TABLE 7

| Catalyst | Noble metal | Rare earth metal | Quenching | Combustion characteristics | |
|---|---|---|---|---|---|
| | | | | Ignition temp. (°C.) | Combustion efficiency (%) |
| A | Pd | Sm | Applied | 300 | 100 |
| B | Pd | Gd | Applied | 300 | 100 |
| C | Pd | La | Applied | 310 | 100 |
| D | Pt | Sm | Applied | 330 | 100 |
| E | Pt | Ce | Applied | 340 | 100 |

We claim:

1. A nitrogen oxides decreasing combustion method which comprises:
   a first step of mixing a fuel and air with each other;
   a second step of bringing the mixture obtained in the first step into contact with a packed catalyst such that only catalytic combustion occurs; and
   a third step of adding a fresh supply of the fuel to a stream obtained from the second step to form a mixed gas and causing the mixed gas to undergo non-catalytic thermal combustion, the temperature of said packed catalyst being lower than the ignition temperature of the mixture and the adiabatic flame temperature of said mixed gas being lower than a temperature at which the nitrogen oxides occur.

2. The method according to claim 1, wherein the temperature of the catalyst ranges from 300° to 900° C.

3. The method according to claim 1, wherein the third step comprises allowimg the mixed gas stream to back-flow or stagnate.

4. The method according to claim 1, wherein the third step comprises exposing said mixed gas to an ignition source.

5. The method according to claim 1, wherein the catalyst is comprised of palladium.

6. The method according to claim 1, wherein the fuel to be added in the third step is supplied through one or more pipes arranged through the catalyst bed.

7. The method according to claim 1, wherein the length of the catalyst in the gas stream direction ranges from 3 to 15 cm.

8. The method according to claim 1, wherein the temperature of the gas at a catalyst inlet ranges from 250° to 500° C.

9. The method according to claim 1, wherein the gas flow velocity at a catalyst inlet ranges from 15 to 40 m/sec.

10. The method according to claim 1, wherein the fuel concentration in the first step is controlled to give a temperature of 700° to 1300° C. as adiabatic flame temperature when the fuel has been burnt.

11. The method according to claim 1, wherein the fuel added in the third step is further added with steam.

12. The method according to claim 1, wherein the third step comprises passing said mixed gas over a swirl-forming or gyration-forming means.

13. The method according to claim 12, wherein the swirl-forming means comprises a non-streamline body.

14. The method according to claim 12, wherein the swirl-forming means comprises a swirler.

15. The method according to claim 12, wherein the swirl-forming means comprises at least one swirl-forming nozzle.

16. The method according to claim 1, wherein the third step comprises subjecting said mixed gas to a dust-collection means.

17. The method according to claim 1, wherein the third step comprises passing said mixed gas through a back-fire preventive means.

18. The method according to claim 1, wherein the third step comprises passing said mixed gas through a flame-holding means equipped with a plurality of flow passages.

19. The method according to claim 1, wherein the catalyst in the second step comprises a plurality of catalysts arranged in parallel to one another.

20. The method according to claim 1, wherein the catalyst comprises a heat-resistant carrier supporting a silica-alumina mixture containing a noble metal and an oxide of a rare earth element.

21. The method according to claim 20, wherein the catalyst comprises a former-stage catalyst and a latter-stage catalyst, and the particle size of the noble metal and the pore size of the silica-alumina carrier is controlled within the range of 50 to 200 Å in the former-stage catalyst and within the range of 1000 to 2000 Å in the latter-stage catalyst.

22. The method according to claim 20, wherein the catalyst comprises a former-stage catalyst and a latter-stage catalyst, and the rare earth element comprises cerium contained in the former-stage catalyst and lanthanum contained in the latter-stage catalyst.

23. The method according to claim 1, wherein the catalyst comprises a heat-resistant carrier supporting a noble metal and fine aluminum particles comprised of an oxide represented by the following formula:

$$MAl_2O_3$$

wherein M represents a rare earth element selected from the group consisting of samarium, gadolinium, cerium, lanthanum, praseodymium and neodymium.

24. The method according to claim 1, wherein the catalyst comprises a heat-resistant carrier and an alumina supported on the heat-resistant carrier and containing a noble metal, which has been subjected to a quenching treatment.

25. The method according to claim 24, wherein the catalyst contains a rare earth metal selected from the group consisting of yttrium, cesium, lanthanum, neodymium, samarium and gadolinium, in the state of an alloy.

* * * * *